United States Patent
Ohta et al.

(10) Patent No.: US 11,430,973 B2
(45) Date of Patent: Aug. 30, 2022

(54) ADHESIVE FOR LITHIUM-ION ELECTRODE, ELECTRODE FOR LITHIUM-ION BATTERY AND METHOD FOR MANUFACTURING ELECTRODE FOR LITHIUM-ION BATTERY

(71) Applicant: SANYO CHEMICAL INDUSTRIES, LTD., Kyoto (JP)

(72) Inventors: Tomoya Ohta, Kyoto (JP); Kotaro Nasu, Kyoto (JP); Kenichi Kawakita, Kyoto (JP); Takuya Suenaga, Kyoto (JP); Yusuke Mori, Kyoto (JP); Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 169 days.

(21) Appl. No.: 16/605,639

(22) PCT Filed: Apr. 20, 2018

(86) PCT No.: PCT/JP2018/016340
§ 371 (c)(1),
(2) Date: Oct. 16, 2019

(87) PCT Pub. No.: WO2018/194164
PCT Pub. Date: Oct. 25, 2018

(65) Prior Publication Data
US 2021/0280844 A1   Sep. 9, 2021

(30) Foreign Application Priority Data
Apr. 21, 2017 (JP) .............................. JP2017-084622

(51) Int. Cl.
*H01M 4/62* (2006.01)
*H01M 4/04* (2006.01)
*H01M 4/13* (2010.01)
*H01M 4/36* (2006.01)

(52) U.S. Cl.
CPC ........... *H01M 4/045* (2013.01); *H01M 4/043* (2013.01); *H01M 4/364* (2013.01)

(58) Field of Classification Search
None
See application file for complete search history.

(56) References Cited

U.S. PATENT DOCUMENTS

| | | |
|---|---|---|
| 2014/0079995 A1 | 3/2014 | Wakada |
| 2014/0248534 A1 | 9/2014 | Chikugo et al. |
| 2015/0132643 A1* | 5/2015 | Sasaki ................... H01M 4/134 429/217 |
| 2015/0312643 A1 | 5/2015 | Sasaki |
| 2017/0033350 A1 | 2/2017 | Mizuno et al. |

FOREIGN PATENT DOCUMENTS

| | | |
|---|---|---|
| EP | 3 493 305 | 6/2019 |
| JP | 2002-105126 | 4/2002 |
| JP | 2004-518770 | 6/2004 |
| JP | 2007-280806 | 10/2007 |
| JP | 2008-546135 | 12/2008 |
| JP | 2011-134618 | 7/2011 |
| JP | 2017-147222 | 8/2017 |
| JP | 2018-055841 | 4/2018 |
| WO | 02/00805 | 1/2002 |
| WO | 2006/123892 | 11/2006 |
| WO | 2012/165422 | 12/2012 |
| WO | 2013/069280 | 5/2013 |
| WO | 2013/161786 | 10/2013 |
| WO | 2015/093411 | 6/2015 |
| WO | 2018/021552 | 2/2018 |

OTHER PUBLICATIONS

International Search Report dated Jun. 19, 2018 in International (PCT) Patent Application No. PCT/JP2018/016340, with English Translation.
International Preliminary Report on Patentability dated Sep. 4, 2019 in International (PCT) Patent Application No. PCT/JP2018/016340.

* cited by examiner

*Primary Examiner* — Tracy M Dove
(74) *Attorney, Agent, or Firm* — Wenderoth, Lind & Ponack, L.L.P.

(57) ABSTRACT

The present invention provides a viscous adhesive capable of retaining the shape of an electrode and allowing for production of an electrode for a lithium-ion battery having a structure in which the energy density of the electrode does not decrease. The present invention relates to a viscous adhesive for a lithium-ion electrode which allows active materials to adhere to each other in a lithium-ion electrode, the viscous adhesive having a glass transition temperature of 60° C. or lower, a solubility parameter of 8 to 13 $(cal/cm^3)^{1/2}$, and a storage shear modulus and a loss shear modulus of $2.0 \times 10^3$ to $5.0 \times 10^7$ Pa as measured in a frequency range of $10^{-1}$ to $10^1$ Hz at 20° C., wherein the viscous adhesive is an acrylic polymer essentially containing a constituent unit derived from a (meth)acrylic acid alkyl ester monomer, the proportion of the (meth)acrylic acid alkyl ester monomer in monomers constituting the viscous adhesive is 50 wt % or more based on the total monomer weight, and the proportion of a fluorine-containing monomer is less than 3 wt % based on the total monomer weight.

16 Claims, No Drawings

ADHESIVE FOR LITHIUM-ION ELECTRODE, ELECTRODE FOR LITHIUM-ION BATTERY AND METHOD FOR MANUFACTURING ELECTRODE FOR LITHIUM-ION BATTERY

TECHNICAL FIELD

The present invention relates to a viscous adhesive for a lithium-ion electrode, an electrode for a lithium-ion battery, and a method of producing an electrode for a lithium-ion battery.

BACKGROUND ART

Reduction in carbon dioxide emissions has been strongly desired in recent years for environmental protection. The automotive industry has placed expectations on the introduction of electric vehicles (EVs) or hybrid electric vehicles (HEVs) to reduce carbon dioxide emissions and has been extensively developing secondary batteries for driving the motors, the key to practical use of these vehicles. Secondary batteries that have received attention include lithium ion batteries, which have high energy density and high output power density.

Patent Literature 1 discloses an electrode for a battery capable of retaining fine particles of an active material on a surface layer of an active material layer of the electrode, wherein the active material layer contains an adhesive material to reinforce the electrode structure.

CITATION LIST

Patent Literature

Patent Literature 1: JP 2007-280806 A

SUMMARY OF INVENTION

Technical Problem

The electrode for a battery disclosed in Patent Literature 1 requires separate addition of an adhesive material besides the active material in order to retain the shape of the electrode. Yet, the adhesive material did not provide sufficient shape retainability to the electrode. In addition, without combination use of a binder, such as polyvinylidene fluoride, that retains the shape by forming a solidified material, it is difficult to form the active material layer and retain the shape of the electrode.

Further, combination use of the adhesive material and the binder decreases the energy density of the electrode by the amount corresponding to the volumes of these components.

The present invention was made in view of the above problems, and aims to provide a viscous adhesive capable of retaining the shape of an electrode and allowing for production of an electrode for a lithium-ion battery having a structure in which the energy density of the electrode does not decrease; an electrode containing the viscous adhesive; and a method of producing such an electrode for a lithium-ion battery.

Solution to Problem

The present inventors conducted extensive studies to solve the problems, and thus arrived at the present invention.

Specifically, the present invention relates to a viscous adhesive for a lithium-ion electrode which allows active materials to adhere to each other in a lithium-ion electrode, the viscous adhesive having a glass transition temperature of 60° C. or lower, a solubility parameter of 8 to 13 $(cal/cm^3)^{1/2}$, and a storage shear modulus and a loss shear modulus of $2.0 \times 10^3$ to $5.0 \times 10^7$ Pa as measured in a frequency range of $10^{-1}$ to $10^1$ Hz at 20° C., wherein the viscous adhesive is an acrylic polymer essentially containing a constituent unit derived from a (meth)acrylic acid alkyl ester monomer, the proportion of the (meth)acrylic acid alkyl ester monomer in monomers constituting the viscous adhesive is 50 wt % or more based on the total monomer weight, and the proportion of a fluorine-containing monomer is less than 3 wt % based on the total monomer weight. The present invention also relates to an electrode for a lithium-ion battery including: an unbound product between the viscous adhesive and a coated electrode active material including an electrode active material that occludes and releases lithium ions and a coating layer containing a coating resin on at least a portion of a surface of the electrode active material. The present invention still also relates to a method of producing an electrode for a lithium-ion battery, including: compressing a mixture of a coated electrode active material and a viscous adhesive for a lithium-ion electrode so as to form an electrode active material layer formed from an unbound product of the mixture containing the coated electrode active material and the viscous adhesive, the coated electrode active material including an electrode active material that occludes and releases lithium ions and a coating layer containing a coating resin on at least a portion of a surface of the electrode active material, the viscous adhesive for a lithium-ion electrode being a viscous adhesive that allows active materials to adhere to each other in a lithium-ion electrode, the viscous adhesive having a glass transition temperature of 60° C. or lower, a solubility parameter of 8 to 13 $(cal/cm^3)^{1/2}$, and a storage shear modulus and a loss shear modulus of $2.0 \times 10^3$ to $5.0 \times 10^7$ Pa as measured in a frequency range of $10^{-1}$ to $10^1$ Hz at 20° C., wherein the viscous adhesive is an acrylic polymer essentially containing a constituent unit derived from a (meth)acrylic acid alkyl ester monomer, the proportion of the (meth)acrylic acid alkyl ester monomer in monomers constituting the viscous adhesive is 50 wt % or more based on the total monomer weight, and the proportion of a fluorine-containing monomer is less than 3 wt % based on the total monomer weight.

Advantageous Effects of Invention

The electrode for a lithium-ion battery containing the viscous adhesive for a lithium-ion electrode of the present invention can retain the shape of the electrode, without containing a binder that binds electrode active materials together through solidification and retains the shape of the electrode. The electrode for a lithium-ion battery has a structure in which the energy density of the electrode does not decrease by the amount of the binder.

Also, since the shape of the electrode is stable, the shape of the electrode is prevented from being destroyed during charging and discharging, and the electrode can have excellent cycle characteristics.

DESCRIPTION OF EMBODIMENTS

The present invention is described in detail below.

The viscous adhesive for a lithium-ion electrode of the present invention is a viscous adhesive for a lithium-ion electrode which allows active materials to adhere to each other in a lithium-ion electrode, the viscous adhesive having a glass transition temperature of 60° C. or lower, a solubility parameter of 8 to 13 $(cal/cm^3)^{1/2}$, and a storage shear modulus and a loss shear modulus of $2.0\times10^3$ to $5.0\times10^7$ Pa as measured in a frequency range of $10^{-1}$ to $10^1$ Hz at 20° C., wherein the viscous adhesive is an acrylic polymer essentially containing a constituent unit derived from a (meth)acrylic acid alkyl ester monomer, the proportion of the (meth)acrylic acid alkyl ester monomer in monomers constituting the viscous adhesive is 50 wt % or more based on the total monomer weight, and the proportion of a fluorine-containing monomer is less than 3 wt % based on the total monomer weight.

The viscous adhesive of the present invention is a viscous adhesive for a lithium-ion electrode. The "lithium-ion electrode" is an electrode for use in a lithium-ion battery and means the same as the "electrode for a lithium-ion battery" as used herein.

The viscous adhesive of the present invention has a glass transition temperature (hereinafter sometimes described as "Tg") of 60° C. or lower. A viscous adhesive having a Tg of higher than 60° C. does not have appropriate flexibility, thus making it difficult to retain the shape of the electrode. In view of shape stability of the electrode, Tg of the viscous adhesive is preferably 40° C. or lower, more preferably 20° C. or lower.

As used herein, Tg is measured by a method (DSC method) defined in ASTM D3418-82 using DSC20 and SSC/580 available from Seiko EG&G Co., Ltd.

The viscous adhesive of the present invention has a solubility parameter (hereinafter sometimes described as "SP value"; the unit is $(cal/cm^3)^{1/2}$) of 8 to 13. A viscous adhesive having an SP value of lower than 8 does not absorb the electrolyte solution, making it difficult for lithium ions to pass therethrough, thus increasing the ionic resistance in the electrode active material layer. A viscous adhesive having an SP value of higher than 13 dissolves in the electrolyte solution, thus making it difficult to retain the shape of the electrode.

The SP value of the viscous adhesive is preferably 8.5 to 12.5, more preferably 9 to 12, in view of conductivity of lithium ions owing to absorption of the electrolyte solution and stability of the shape of the electrode in the electrolyte solution.

The SP value in the present invention is calculated by the method proposed by Fedors et al. which is described in the following article.

Polymer Engineering & Science, February, 1974, Vol. 14, No. 2, Robert F. Fedors (pp. 147 to 154)

The viscous adhesive of the present invention has a storage shear modulus and a loss shear modulus of $2.0\times10^3$ to $5.0\times10^7$ Pa as measured in a frequency range of $10^{-1}$ to $10^1$ Hz at 20° C.

When the storage shear modulus is higher than $5.0\times10^7$ Pa or the loss shear modulus is higher than $2.0\times10^7$ Pa, the viscous adhesive does not have appropriate flexibility, thus making it difficult to retain the shape of the electrode. The same applies to the case where the storage shear modulus is less than $2.0\times10^3$ Pa or the loss shear modulus is less than $5.0\times10^3$ Pa.

In view of shape stability of the electrode, the viscous adhesive of the present invention preferably has a storage shear modulus and a loss shear modulus of $5.0\times10^3$ to $2.0\times10^7$ Pa, more preferably $1.0\times10^4$ to $1.0\times10^7$ Pa, as measured in a frequency range of $10^{-1}$ to $10^1$ Hz at 20° C.

The storage shear modulus and loss shear modulus in the present invention can be determined by molding the viscous adhesive (0.8 g) with a pressure of 30 MPa using a ϕ20-mm die and measuring the molded viscous adhesive using a ϕ20-mm parallel cone in Advanced Rheometric Expansion System available from TA Instruments, under the following conditions: frequency of 0.1 to 10 Hz ($10^{-1}$ to $10^1$ Hz), temperature of 20° C., and strain of 0.1% (automated strain control; allowable minimum stress: 1.0 g/cm; allowable maximum stress: 500 g/cm; maximum additional strain: 200%, strain adjustment: 200%).

That "the storage shear modulus and loss shear modulus of the viscous adhesive of the present invention are $2.0\times10^3$ to $5.0\times10^7$ Pa in a frequency range of $10^{-1}$ to $10^1$ Hz" means that the storage shear modulus and loss shear modulus in the entire frequency range of $10^{-1}$ to $10^1$ Hz are in the above range.

The Tg of the viscous adhesive of the present invention can be lowered or increased by respectively extending (elongating) or shortening the alkyl chain of the (meth) acrylic acid alkyl ester monomer.

The SP value of the viscous adhesive of the present invention can be increased by copolymerizing the (meth) acrylic acid alkyl ester monomer with a monovinyl monomer containing a nitrile group, a hydroxy group, or the like; and can be decreased by copolymerizing the (meth)acrylic acid alkyl ester monomer with a monovinyl monomer containing a fluoro group, siloxane, or the like.

The storage shear modulus and loss shear modulus of the viscous adhesive of the present invention can be controlled by adjusting the Tg value, the molecular weight of the acrylic polymer, or the amount of the crosslinking agent.

The viscous adhesive of the present invention is an acrylic polymer essentially containing a constituent unit derived from a (meth)acrylic acid alkyl ester monomer, and the weight proportion of the (meth)acrylic acid alkyl ester monomer in monomers constituting the viscous adhesive is 50 wt % or more based on the total monomer weight.

The weight proportion (wt %) of the (meth)acrylic acid alkyl ester monomer can be measured, for example, by a method in which the polymer is dissolved in a supercritical fluid and the resulting oligomer component is analyzed by gas chromatography mass spectrometry (GC-MS).

When the weight proportion of the (meth)acrylic acid alkyl ester monomer in monomers constituting the viscous adhesive is less than 50 wt % based on the total monomer weight, the viscous adhesive does not have appropriate viscous adhesive force, resulting in poor shape stability of the electrode.

Examples of the (meth)acrylic acid alkyl ester monomer include 2-ethylhexyl acrylate, 2-ethylhexyl methacrylate, n-butyl acrylate, n-butyl methacrylate, iso-butyl methacrylate, methyl methacrylate, methyl acrylate, and (meth) acrylic acid alkyl ester monomers whose alkyl chain is terminated with a hydroxy group such as 2-hydroxyethyl acrylate and 2-hydroxyethyl methacrylate.

Polyfunctional acrylate is also encompassed by the (meth) acrylic acid alkyl ester monomer. Examples of the polyfunctional acrylate include 1,6-hexanediol dimethacrylate, and ethylene glycol dimethacrylate. In view of shape stability of the electrode, the weight proportion of the polyfunctional acrylate is preferably 0.1 to 3 wt % based on the total monomer weight.

Preferably, the viscous adhesive of the present invention contains two or more (meth)acrylic acid alkyl ester monomers as constituent monomers, and the total content of these monomers is 50 wt % or more based on the total constituent monomer weight. Examples of the (meth)acrylic acid alkyl ester monomer are as described above. Preferred combinations include a combination of n-butyl acrylate and 2-ethylhexyl acrylate, a combination of methyl acrylate and n-butyl acrylate, and a combination of methyl methacrylate and iso-butyl methacrylate.

In view of shape retainability, the weight proportion of the (meth)acrylic acid alkyl ester monomer in monomers constituting the viscous adhesive is preferably 65 wt % or more based on the total monomer weight.

Preferably, the viscous adhesive of the present invention contains a (meth)acrylic acid monomer as a constituent monomer other than the (meth)acrylic acid alkyl ester monomer. When the (meth)acrylic acid monomer is contained as a constituent monomer, by-products such as lithium hydroxide generated in the battery can be neutralized to prevent corrosion of the electrode.

The weight proportion of the (meth)acrylic acid monomer is preferably 0.1 to 15 wt % based on the total constituent monomer weight.

The viscous adhesive of the present invention may contain, as a constituent monomer, a monovinyl monomer copolymerizable with a (meth)acrylic acid alkyl ester monomer.

The monovinyl monomer can be a monovinyl monomer containing a fluoro group, siloxane, or the like (e.g., dimethylsiloxane).

In the viscous adhesive of the present invention, the weight proportion of the fluorine-containing monomer is less than 3 wt % based on the total monomer weight. A viscous adhesive having a fluorine-containing monomer content of 3 wt % or more is less concealable to the electrode active material and is insufficient in viscous adhesive force and flexibility, thus making it difficult to retain the shape of the electrode.

In view of shape stability of the electrode, the weight proportion of the fluorine-containing monomer is less than 2 wt %, more preferably 0 wt % (absent), based on the total monomer weight.

The weight proportion of the fluorine-containing monomer in the viscous adhesive of the present invention can be measured, for example, by a method in which the polymer is dissolved in a supercritical fluid and the resulting oligomer component is analyzed by gas chromatography mass spectrometry (GC-MS).

The lower limit of the weight average molecular weight of the viscous adhesive of the present invention is preferably 10,000, more preferably 50,000, still more preferably 100,000, and the upper limit thereof is preferably 1,000,000, more preferably 800,000, still more preferably 500,000, particularly preferably 400,000.

The weight average molecular weight of the viscous adhesive of the present invention can be measured by gel permeation chromatography (hereinafter abbreviated as "GPC") under the following conditions.
Device: "HLC-8120GPC" (Tosoh Corporation)
Column: "TSKgel GMHXL" (two columns) and "TSKgel Multipore HXL-M (one column) connected together" (Tosoh Corporation)
Sample solution: 0.25 wt % solution in tetrahydrofuran
Amount of solution to be injected: 10 μL
Flow rate: 0.6 mL/min
Measurement temperature: 40° C.
Detector: refractive index detector
Standard substance: standard polystyrene (Tosoh Corporation)

The viscous adhesive of the present invention can be produced by a known polymerization method (solution polymerization) using a known polymerization initiator (e.g., an azo initiator (such as 2,2'-azobis(2-methylpropionitrile), 2,2'-azobis(2-methylbutyronitrile), or 2,2'-azobis(2,4-dimethylvaleronitrile)) or a peroxide initiator (such as benzoyl peroxide, di-t-butyl peroxide, or lauryl peroxide)).

The amount of the polymerization initiator is preferably 0.01 to 5 wt %, more preferably 0.05 to 2 wt %, still more preferably 0.1 to 1.5 wt %, based on the total monomer weight, in view of adjusting the molecular weight to a preferred range, for example.

The polymerization temperature and polymerization time are adjusted according to the type of the polymerization initiator and the like. Yet, the polymerization temperature is preferably −5° C. to 150° C. (more preferably 30° C. to 120° C.) and the reaction time is preferably 0.1 to 50 hours (more preferably 2 to 24 hours).

Examples of a solvent for use in polymerization include esters (C2-C8, such as ethyl acetate and butyl acetate), alcohols (C1-C8, such as methanol, ethanol, and octanol), hydrocarbons (C4-C8, such as n-butane, cyclohexane, and toluene), and ketones (C3-C9, such as methyl ethyl ketone). The amount of the solvent is preferably 5 to 900 wt %, more preferably 10 to 400 wt %, particularly preferably 30 to 300 wt %, based on the total monomer weight, in view of adjusting the molecular weight to a preferred range, for example. The monomer concentration is preferably 10 to 95 wt %, more preferably 20 to 90 wt %, particularly preferably 30 to 80 wt %.

A known chain transfer agent can be used in polymerization. Examples include mercapto compounds (e.g., dodecyl mercaptan and n-butyl mercaptan) and halogenated hydrocarbons (e.g., carbon tetrachloride, carbon tetrabromide, and benzyl chloride).

The electrode for a lithium-ion battery of the present invention is an electrode for a lithium-ion battery including: an unbound product between the viscous adhesive of the present invention and a coated electrode active material including an electrode active material that occludes and releases lithium ions and a coating layer containing a coating resin on at least a portion of a surface of the electrode active material.

The components of the electrode for a lithium-ion battery of the present invention are described below.

The coated electrode active material is an electrode active material having a coating layer on a portion of a surface thereof. The coating layer contains a coating resin.

The surface of the electrode active material is preferably coated with the coating layer because it facilitates maintaining a constant distance between the electrode active materials and thus facilitates maintaining the conductive path.

The electrode active material may be a positive electrode active material or a negative electrode active material. When the electrode active material is a positive electrode active material, the electrode for a lithium-ion battery is a positive electrode. When the electrode active material is a negative electrode active material, the electrode for a lithium-ion battery is a negative electrode.

Examples of the positive electrode active material as an electrode active material include complex oxides of lithium and transition metals (such as complex oxides containing one transition metal (e.g., $LiCoO_2$, $LiNiO_2$, $LiAlMnO_4$, $LiMnO_2$, and $LiMn_2O_4$), complex oxides containing two transition metal elements (e.g., $LiFeMnO_4$, $LiNi_{1-x}Co_xO_2$, $LiMn_{1-y}Co_yO_2$, $LiNi_{1/3}Co_{1/3}Al_{1/3}O_2$, and $LiNi_{0.8}Co_{0.15}Al_{0.05}O_2$), and complex oxides containing three or more metal elements (e.g., LiMaM'bM"cO$_2$ wherein M, M' and M" are each a different transition metal element, and a+b+c=1, e.g., LiNi$_{1/3}$Mn$_{1/3}$Co$_{1/3}$O$_2$)), lithium-containing transition metal phosphates (e.g., LiFePO$_4$, LiCoPO$_4$, LiMnPO$_4$, and LiNiPO$_4$), transition metal oxides (e.g., MnO$_2$ and V$_2$O$_5$), transition metal sulfides (e.g., MoS$_2$ and TiS$_2$), and conductive polymers (e.g., polyaniline, polypyrrole, polythiophene, polyacetylene, poly-p-phenylene, and polyvinylcarbazole). These may be used in combination of two or more thereof.

The lithium-containing transition metal phosphates may be those in which the transition metal site is partially replaced by another transition metal.

Examples of the negative electrode active material as an electrode active material include carbon materials (such as graphite, non-graphitizable carbon, amorphous carbon, products obtained by firing resin (e.g., those obtained by firing and carbonating phenol resin and furan resin), coke (e.g., pitch coke, needle coke, and petroleum coke), silicon carbide, and carbon fibers); conductive polymers (such as polyacetylene and polypyrrole); silicon compounds (silicon, silicon oxide (SiOx), Si—C composite, Si—Al alloy, Si—Li alloy, Si—Ni alloy, Si—Fe alloy, Si—Ti alloy, Si—Mn alloy, Si—Cu alloy, and Si—Sn alloy); metals (such as tin, aluminum, zirconium, and titanium); metal oxides (such as titanium oxide, lithium-titanium oxide, and silicon oxide); and metal alloys (such as Li—Sn alloy, Li—Al alloy, and Li—Al—Mn alloy); and mixtures of these materials and a carbon material.

Examples of the Si—C composite include silicon particles and silicon oxide particles in which the surface of each particle is covered with carbon and/or silicon carbide.

Of these negative electrode active materials, those not containing lithium or lithium ions inside may be pre-doped to allow the active material to partially or entirely contain lithium or lithium ions in advance.

The coating layer contains a coating resin, and if necessary, may further contain a conductive additive described later.

The coated electrode active material is an electrode active material whose surface is partially or entirely covered with a coating layer. In the electrode active material layer, even if the coated electrode active materials came into contact with each other and their coating layers thus came into contact with each other, the coating layers would not integrate with each other so that the interface between the coating layers would not disappear. In other words, on the contact surface, the coated electrode active materials would not be irreversibly bonded together by the coating resin, and can be separated without destroying the coating layer of each coated active material.

Examples of the coating resin that is contained in the coating layer include thermoplastic resins and thermosetting resins. Preferred examples include acrylic resin, urethane resin, silicone resin, and butadiene-based resins (e.g., styrene butadiene copolymer resin, butadiene polymers (e.g., butadiene rubber and liquid polybutadiene)). These resins are preferred because they form elastic bodies and thus can conform to volume changes of the active material.

The coating resin is particularly preferably an acrylic resin.

Still more preferred among these is a coating resin having a liquid absorption rate of 10% or more when immersed in an electrolyte solution and having a tensile elongation at break of 10% or more when saturated with the electrolyte solution.

The liquid absorption rate of the coating resin when immersed in an electrolyte solution can be determined by measuring the weight of the coating resin before and after immersion in the electrolyte solution and using the following formula.

Liquid absorption rate (%)=[(<Weight of coating resin after immersion in electrolyte solution>−<Weight of coating resin before immersion in electrolyte solution>)/Weight of coating resin before immersion in electrolyte solution]×100

The electrolyte solution to be used to determine the liquid absorption rate is preferably an electrolyte solution in which LiPF$_6$ as an electrolyte is dissolved to a concentration of 1 mol/L in a solvent mixture in which ethylene carbonate (EC) and diethyl carbonate (DEC) are mixed in a volume ratio (EC:DEC) of 3:7.

To determine the liquid absorption rate, the coating resin is immersed in the electrolyte solution at 50° C. for 3 days. The coating resin will be saturated with the electrolyte solution after being immersed in the electrolyte solution at 50° C. for 3 days. The term "saturated with the electrolyte solution" refers to the state where the weight of the coating resin does not increase anymore even if the coating resin is immersed in the electrolyte solution for a longer time.

The electrolyte solution to be used for the production of the lithium-ion battery using the electrode for a lithium-ion battery of the present invention is not limited to the electrolyte solution mentioned above. Any other electrolyte solution may be used.

When the liquid absorption rate is 10% or more, the lithium ions can easily pass through the coating resin, so that ionic resistance in the electrode active material layer can be maintained at a low level. When the liquid absorption rate is less than 10%, the conductivity of lithium ions may decrease, resulting in poor performance of the lithium-ion battery.

The liquid absorption rate is preferably 20% or more, more preferably 30% or more.

The upper limit of the liquid absorption rate is preferably 400%, more preferably 300%.

The tensile elongation at break of the coating resin when saturated with the electrolyte solution can be measured as follows: the coating resin is punched into a dumbbell shape to obtain a sample; the sample is immersed in an electrolyte solution at 50° C. for 3 days in the same manner as in the measurement of the liquid absorption rate so as to be saturated with the electrolyte solution; and the tensile elongation at break is measured according to ASTM D683 (specimen's shape: Type II). The tensile elongation at break is the rate of elongation until the specimen breaks in a tensile test as calculated by the following formula:

Tensile elongation at break (%)=[((Specimen's length at break)−(Specimen's length before test))/Specimen's length before test]×100

The coating resin having a tensile elongation at break of 10% or more when saturated with the electrolyte solution has adequate flexibility. This helps preventing the coating layer from being separated due to volume changes of the electrode active material during charging and discharging.

The tensile elongation at break is preferably 20% or more, more preferably 30% or more.

The upper limit of the tensile elongation at break is preferably 400%, more preferably 300%.

The acrylic resin for use in the coating resin is preferably a resin containing a polymer (A1) containing an acrylic monomer (a) as an essential constituent monomer.

The polymer (A1) is particularly preferably a polymer of a monomer composition that contains, as the acrylic monomers (a), a monomer (a1) containing a carboxyl group or an acid anhydride group and a monomer (a2) represented by the following formula (1):

$$CH_2=C(R^1)COOR^2 \quad (1)$$

wherein $R^1$ is a hydrogen atom or a methyl group and $R^2$ is a C4-C12 linear or C3-C36 branched alkyl group.

Examples of the monomer (a1) containing a carboxyl group or an acid anhydride group include C3-C15 monocarboxylic acids such as a (meth)acrylic acid (a11), crotonic acid, and cinnamic acid; C4-C24 dicarboxylic acids such as (anhydrous) maleic acid, fumaric acid, (anhydrous) itaconic acid, citraconic acid, and mesaconic acid; and C6-C24 trivalent or tetravalent or higher-valent polycarboxylic acids such as aconitic acid. Of these, the (meth)acrylic acid (a11) is preferred, and methacrylic acid is more preferred.

In the monomer (a2) represented by the formula (1), $R^1$ is a hydrogen atom or a methyl group. $R^1$ is preferably a methyl group.

$R^2$ is preferably a C4-C12 linear or branched alkyl group, or a C13-C36 branched alkyl group.

(a21) Ester compound in which $R^2$ is a C4-C12 linear or branched alkyl group

Examples of the C4-C12 linear alkyl group include butyl, pentyl, hexyl, heptyl, octyl, nonyl, decyl, undecyl, and dodecyl groups.

Examples of the C4-C12 branched alkyl group include 1-methylpropyl (sec-butyl), 2-methylpropyl, 1,1-dimethylethyl (tert-butyl), 1-methylbutyl, 1,1-dimethylpropyl, 1,2-dimethylpropyl, 2,2-dimethylpropyl (neopentyl), 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 1-ethylbutyl, 2-ethylbutyl, 1-methylhexyl, 2-methylhexyl, 2-methylhexyl, 4-methylhexyl, 5-methylhexyl, 1-ethylpentyl, 2-ethylpentyl, 3-ethylpentyl, 1,1-dimethylpentyl, 1,2-dimethylpentyl, 1,3-dimethylpentyl, 2,2-dimethylpentyl, 2,3-dimethylpentyl, 2-ethylpentyl, 1-methylheptyl, 2-methylheptyl, 3-methylheptyl, 4-methylheptyl, 5-methylheptyl, 6-methylheptyl, 1,1-dimethylhexyl, 1,2-dimethylhexyl, 1,3-dimethylhexyl, 1,4-dimethylhexyl, 1,5-dimethylhexyl, 1-ethylhexyl, 2-ethylhexyl, 1-methyloctyl, 2-methyloctyl, 3-methyloctyl, 4-methyloctyl, 5-methyloctyl, 6-methyloctyl, 7-methyloctyl, 1,1-dimethylheptyl, 1,2-dimethylheptyl, 1,3-dimethylheptyl, 1,4-dimethylheptyl, 1,5-dimethylheptyl, 1,6-dimethylheptyl, 1-ethylheptyl, 2-ethylheptyl, 1-methylnonyl, 2-methylnonyl, 3-methylnonyl, 4-methylnonyl, 5-methylnonyl, 6-methylnonyl, 7-methylnonyl, 8-methylnonyl, 1,1-dimethyloctyl, 1,2-dimethyloctyl, 1,3-dimethyloctyl, 1,4-dimethyloctyl, 1,5-dimethyloctyl, 1,6-dimethyloctyl, 1,7-dimethyloctyl, 1-ethyloctyl, 2-ethyloctyl, 1-methyldecyl, 2-methyldecyl, 3-methyldecyl, 4-methyldecyl, 5-methyldecyl, 6-methyldecyl, 7-methyldecyl, 8-methyldecyl, 9-methyldecyl, 1,1-dimethylnonyl, 1,2-dimethylnonyl, 1,3-dimethylnonyl, 1,4-dimethylnonyl, 1,5-dimethylnonyl, 1,6-dimethylnonyl, 1,7-dimethylnonyl, 1,8-dimethylnonyl, 1-ethylnonyl, 2-ethylnonyl, 1-methylundecyl, 2-methylundecyl, 3-methylundecyl, 4-methylundecyl, 5-methylundecyl, 6-methylundecyl, 7-methylundecyl, 8-methylundecyl, 9-methylundecyl, 10-methylundecyl, 1,1-dimethyldecyl, 1,2-dimethyldecyl, 1,3-dimethyldecyl, 1,4-dimethyldecyl, 1,5-dimethyldecyl, 1,6-dimethyldecyl, 1,7-dimethyldecyl, 1,8-dimethyldecyl, 1,9-dimethyldecyl, 1-ethyldecyl, and 2-ethyldecyl groups. Of these, a butyl group and a 2-ethylhexyl group are particularly preferred.

(a22) Ester compound in which $R^2$ is a C13-C36 branched alkyl group

Examples of the C13-C36 branched alkyl group include 1-alkylalkyl groups (such as 1-methyldodecyl, 1-butyleicosyl, 1-hexyloctadecyl, 1-octylhexadecyl, 1-decyltetradecyl, and 1-undecyltridecyl groups), 2-alkylalkyl groups (such as 2-methyl dodecyl, 2-hexyloctadecyl, 2-octylhexadecyl, 2-decyltetradecyl, 2-undecyltridecyl, 2-dodecylhexadecyl, 2-tridecylpentadecyl, 2-decyloctadecyl, 2-tetradecyloctadecyl, 2-hexadecyloctadecyl, 2-tetradecyleicosyl, and 2-hexadecyleicosyl groups), 3- to 34-alkylalkyl groups (such as 3-alkylalkyl, 4-alkylalkyl, 5-alkylalkyl, 32-alkylalkyl, 33-alkylalkyl, and 34-alkylalkyl groups), and mixed alkyl groups containing one or more branched alkyl groups, such as those obtained by removing hydroxy groups from oxo alcohol obtained from propylene oligomers (heptamer to undecamer), ethylene/propylene (molar ratio: 16/1 to 1/11) oligomers, isobutylene oligomers (heptamer to octamer), and α-olefin (C5-C20) oligomers (tetramer to octamer), for example. Of these, a 2-decyltetradecyl group is particularly preferred.

Preferably, the polymer (A1) further contains an ester compound (a3) from C1-C3 monohydric aliphatic alcohol and (meth)acrylic acid.

Examples of the C1-C3 monohydric aliphatic alcohol constituting the ester compound (a3) include methanol, ethanol, 1-propanol, and 2-propanol.

The amount of the ester compound (a3) is preferably 10 to 60 wt %, more preferably 15 to 55 wt %, still more preferably 20 to 50 wt %, based on the total weight of the polymer (A1), in view of controlling-volume changes and the like of the electrode active material.

The polymer (A1) may further contain a salt (a4) of an anionic monomer having a polymerizable unsaturated double bond and an anionic group.

Examples of a structure having a polymerizable unsaturated double bond include vinyl, allyl, styrenyl, and (meth)acryloyl groups.

Examples of the anionic group include a sulfonic acid group and a carboxyl group.

The anionic monomer having a polymerizable unsaturated double bond and an anionic group is a compound obtained by a combination thereof. Examples include vinylsulfonic acid, allylsulfonic acid, styrenesulfonic acid, and (meth)acrylic acid.

The term "(meth)acryloyl group" means acryloyl group and/or methacryloyl group.

Examples of cations constituting the salt (a4) of an anionic monomer include lithium ions, sodium ions, potassium ions, and ammonium ions.

When the salt (a4) of an anionic monomer is contained, the amount is preferably 0.1 to 15 wt %, more preferably 1 to 15 wt %, still more preferably 2 to 10 wt %, based on the total weight of the coating resin, in view of internal resistance and the like.

The polymer (A1) preferably contains the (meth)acrylic acid (a11) and the ester compound (a21), more preferably further contains the ester compound (a3).

The polymer (A1) is particularly preferably a copolymer of methacrylic acid, 2-ethylhexyl methacrylate, and methyl methacrylate, in which the methacrylic acid is the (meth)acrylic acid (a11), the 2-ethylhexyl methacrylate is the ester compound (a21), and the methyl methacrylate is the ester compound (a3).

Preferably, the coating resin is obtained by polymerizing a monomer composition containing the (meth)acrylic acid (a11), the monomer (a2), the ester compound (a3) from a C1-C3 monohydric aliphatic alcohol and (meth)acrylic acid, and if necessary, the salt (a4) of an anionic monomer having a polymerizable unsaturated double bond and an anionic group, and the weight ratio of the monomer (a2) to the (meth)acrylic acid (a11) (the ester compound (a21)/the (meth)acrylic acid (a11)) is 10/90 to 90/10.

When the weight ratio of the monomer (a2) to the (meth)acrylic acid (a11) is 10/90 to 90/10, a polymer obtained by polymerizing these monomers has good adhesion to the electrode active material and is less likely to be separated from the electrode active material.

The weight ratio is preferably 30/70 to 85/15, more preferably 40/60 to 70/30.

In addition to the monomer (a1) containing a carboxyl group or an acid anhydride group, the monomer (a2) represented by the formula (1), the ester compound (a3) from a C1-C3 monohydric aliphatic alcohol and (meth)acrylic acid, and the salt (a4) of an anionic monomer having a polymerizable unsaturated double bond and an anionic group, the monomers constituting the polymer (A1) may also include a radical polymerizable monomer (a5) copolymerizable with the monomer (a1), the monomer (a2) represented by the formula (1), and the ester compound (a3) from a C1-C3 monohydric aliphatic alcohol and (meth)acrylic acid as long as the physical properties of the polymer (A1) are not impaired.

The radical polymerizable monomer (a5) is preferably a monomer free of active hydrogen, and any of the following monomers (a51) to (a58) can be used.

The monomer (a51) is hydrocarbyl (meth)acrylate formed from a C13-C20 linear aliphatic monool, C5-C20 alicyclic monool, or C7-C20 aromatic-aliphatic monool and (meth)acrylic acid. Examples include (i) linear aliphatic monools (e.g., tridecyl alcohol, myristyl alcohol, pentadecyl alcohol, cetyl alcohol, heptadecyl alcohol, stearyl alcohol, nonadecyl alcohol, and arachidyl alcohol), (ii) alicyclic monools (e.g., cyclopentyl alcohol, cyclohexyl alcohol, cycloheptyl alcohol, and cyclooctyl alcohol), (iii) aromatic-aliphatic monools (e.g., benzyl alcohol), mixtures of two or more of these monomers (i) to (iii), and hydrocarbyl (meth)acrylate formed from (meth)acrylic acid.

The monomer (a52) is a poly(n=2 to 30)oxyalkylene (C2-C4) alkyl (C1-C18) ether (meth)acrylate. Examples include methanol ethylene oxide (hereinafter abbreviated as "EO") (10 mol) adduct (meth)acrylate, and methanol propylene oxide (hereinafter abbreviated as "PO") (10 mol) adduct (meth)acrylate.

The monomer (a53) is a nitrogen-containing vinyl compound. Examples include the following compounds (a53-1) to (a53-5).
(a53-1) Amide group-containing vinyl compound
(i) C3-C30 (meth)acrylamide compounds such as N,N-dialkyl (C1-C6) or diaralkyl (C7-C15) (meth)acrylamides (e.g., N,N-dimethylacrylamide and N,N-dibenzylacrylamide), and diacetone acrylamide
(ii) C4-C20 amide group-containing vinyl compounds excluding the (meth)acrylamide compounds, such as N-methyl-N-vinylacetamide, and cyclic amides (pyrrolidone compounds (C6-C13, such as N-vinylpyrrolidone))
(a53-2) Nitrogen-containing (meth)acrylate compound
(i) Dialkyl (C1-C4) aminoalkyl (C1-C4) (meth)acrylates, such as N,N-dimethylaminoethyl (meth)acrylate, N,N-diethylaminoethyl (meth)acrylate, t-butylaminoethyl (meth)acrylate, and morpholinoethyl (meth)acrylate
(ii) Quaternary ammonium group-containing (meth)acrylates, such as quaternized products of tertiary amino group-containing (meth)acrylates (e.g., N,N-dimethylaminoethyl (meth)acrylate and N,N-diethylaminoethyl (meth)acrylate) (quaternized products obtained using a quaternization agent, such as methyl chloride, dimethyl sulfate, benzyl chloride, and dimethyl carbonate)
(a53-3) Heterocycle-containing vinyl compound
Pyridine compounds (C7-C14, e.g., 2- or 4-vinylpyridine), imidazole compounds (C5-C12, e.g., N-vinylimidazole), pyrrole compounds (C6-C13, e.g., N-vinylpyrrole), and pyrrolidone compounds (C6-C13, e.g., N-vinyl-2-pyrrolidone)
(a53-4) Nitrile group-containing vinyl compound
C3-C15 nitrile group-containing vinyl compounds, such as (meth)acrylonitrile, cyanostyrene, and cyanoalkyl (C1-C4) acrylate
(a53-5) Another nitrogen-containing vinyl compound
Nitro group-containing vinyl compounds (C8-C16, e.g., nitrostyrene) and the like.

The monomer (a54) is a vinyl group-containing hydrocarbon. Examples include the following compounds (a54-1) to (a54-3).
(a54-1) Vinyl group-containing aliphatic hydrocarbon
C2-C18 or more olefins (e.g., ethylene, propylene, butene, isobutylene, pentene, heptene, diisobutylene, octene, dodecene, and octadecene), C4-C10 or more dienes (e.g., butadiene, isoprene, 1,4-pentadiene, 1,5-hexadiene, and 1,7-octadiene), and the like
(a54-2) Alicyclic unsaturated hydrocarbon
C4-C18 or more cyclic unsaturated compounds, such as cycloalkene (e.g., cyclohexene), (di)cycloalkadiene (e.g., (di)cyclopentadiene), terpenes (e.g., pinene and limonene), and indene
(a54-3) Vinyl group-containing aromatic hydrocarbon
C8-C20 or more aromatic unsaturated compounds, such as styrene, α-methylstyrene, vinyltoluene, 2,4-dimethylstyrene, ethylstyrene, isopropylstyrene, butylstyrene, phenylstyrene, cyclohexylstyrene, and benzylstyrene The monomer (a55) is a vinyl ester. Examples include aliphatic vinyl esters (C4-C15, such as alkenyl esters of aliphatic carboxylic acids (mono- or dicarboxylic acids) (e.g., vinyl acetate, vinyl propionate, vinyl butyrate, diallyl adipate, isopropenyl acetate, and vinyl methoxy acetate)), aromatic vinyl esters (C9-C20, such as alkenyl esters of aromatic carboxylic acids (mono- or dicarboxylic acids) (e.g., vinyl benzoate, diallyl phthalate, methyl-4-vinyl benzoate), and aromatic ring-containing esters of aliphatic carboxylic acids (e.g., acetoxystyrene)).

The monomer (a56) is a vinyl ether. Examples include aliphatic vinyl ethers (C3-C15, such as vinyl alkyl (C1-C10) ethers (e.g., vinyl methyl ether, vinyl butyl ether, and vinyl-2-ethyl hexyl ether), vinyl alkoxy (C1-C6) alkyl (C1-C4) ethers (e.g., vinyl-2-methoxyethyl ether, methoxybutadiene, 3,4-dihydro-1,2-pyran, 2-butoxy-2'-vinyloxy diethyl ether, and vinyl-2-ethyl mercaptoethyl ether), poly(2 to 4) (meth)allyloxyalkanes (C2-C6) (e.g., diallyloxyethane, triallyloxyethane, tetraallyloxyethane, and tetramethallyloxyyethane)), and aromatic vinyl ethers (C8-C20, such as vinyl phenyl ether and phenoxystyrene).

The monomer (a57) is a vinyl ketone. Examples include aliphatic vinyl ketones (C4-C25, such as vinyl methyl ketone and vinyl ethyl ketone), and aromatic vinyl ketones (C9-C21, such as vinyl phenyl ketone).

The monomer (a58) is an unsaturated dicarboxylic acid diester. Examples include C4-C34 unsaturated dicarboxylic acid diesters, such as dialkyl fumarates (two alkyl groups are each a C1-C22 linear, branched, or alicyclic group) and dialkyl maleates (two alkyl groups are each a C1-C22 linear, branched, or alicyclic group).

Of the examples of the radical polymerizable monomer (a5), the monomer (a51), the monomer (a52), and the monomer (a53) are preferred in view of withstand voltage.

In the polymer (A1), the amounts of the monomer (a1) containing a carboxyl group or an acid anhydride group, the monomer (a2) represented by the formula (1), the ester compound (a3) from a C1-C3 monohydric aliphatic alcohol and (meth)acrylic acid, the salt (a4) of an anionic monomer having a polymerizable unsaturated double bond and an anionic group, and the radical polymerizable monomer (a5) are as follows based on the weight of the polymer (A1): (a1) 0.1 to 80 wt %; (a2) 0.1 to 99.9 wt %; (a3) 0 to 60 wt %; (a4) 0 to 15 wt %; and (a5) 0 to 99.8 wt %.

When the amounts of these monomers are in the above ranges, the non-aqueous electrolyte solution can be successfully absorbed.

The lower limit of the weight average molecular weight of the polymer (A1) is preferably 3,000, more preferably 50,000, still more preferably 60,000. The upper limit thereof is preferably 2,000,000, more preferably 1,500,000, still more preferably 1,000,000, particularly preferably 120,000.

The weight average molecular weight of the polymer (A1) can be measured by gel permeation chromatography (hereinafter abbreviated as "GPC") under the following conditions.
Device: "HLC-8120GPC" (Tosoh Corporation)
Column: "TSKgel GMHXL" (two columns) and "TSKgel Multipore HXL-M (one column) connected together" (Tosoh Corporation)
Sample solution: 0.25 wt % solution in tetrahydrofuran
Amount of solution to be injected: 10 μL
Flow rate: 0.6 mL/min
Measurement temperature: 40° C.
Detector: refractive index detector
Standard substance: standard polystyrene (Tosoh Corporation)

The polymer (A1) can be produced by a known polymerization method (such as bulk polymerization, solution polymerization, emulsion polymerization, or suspension polymerization), using a known polymerization initiator (e.g., an as azo initiator (such as 2,2'-azobis(2-methylpropionitrile) or 2,2'-azobis(2,4-dimethylvaleronitrile)) or a peroxide initiator (such as benzoyl peroxide, di-t-butyl peroxide, or lauryl peroxide)).

The amount of the polymerization initiator is preferably 0.01 to 5 wt %, more preferably 0.05 to 2 wt %, still more preferably 0.1 to 1.5 wt %, based on the total monomer weight, in view of adjusting the molecular weight to a preferred range, for example. The polymerization temperature and the polymerization time are adjusted according to the type of the polymerization initiator and the like. Yet, the polymerization temperature is preferably −5° C. to 150° C., (more preferably 30° C. to 120° C.), and the reaction time is preferably 0.1 to 50 hours (more preferably 2 to 24 hours).

Examples of a solvent to be used in solution polymerization include esters (C2-C8, such as ethyl acetate and butyl acetate), alcohols (C1-C8, such as methanol, ethanol, and octanol), hydrocarbons (C4-C8, such as n-butane, cyclohexane, and toluene), and ketones (C3-C9, such as methyl ethyl ketone). The amount of the solvent is preferably 5 to 900 wt %, more preferably 10 to 400 wt %, particularly preferably 30 to 300 wt %, based on the total monomer weight, in view of adjusting the molecular weight to a preferred range, for example. The monomer concentration is preferably 10 to 95 wt %, more preferably 20 to 90 wt %, particularly preferably 30 to 80 wt %.

Examples of a dispersion medium for use in emulsion polymerization and suspension polymerization include water, alcohols (e.g., ethanol), esters (e.g., ethyl propionate), and light naphtha; and examples of an emulsifier include metal salts of higher fatty acids (C10-C24) (e.g., sodium oleate and sodium stearate), metal salts of sulfates of higher alcohol (C10-C24) (e.g., sodium lauryl sulfate), ethoxylated tetramethyl decyne diol, sodium sulfoethyl methacrylate, and dimethylamino methyl methacrylate. Further, a stabilizer such as polyvinyl alcohol or polyvinyl pyrrolidone may be added.

The monomer concentration in the solution or the dispersion is preferably 5 to 95 wt %, more preferably 10 to 90 wt %, still more preferably 15 to 85 wt %. The amount of the polymerization initiator based on the total monomer weight is preferably 0.01 to 5 wt %, more preferably 0.05 to 2 wt %.

A known chain transfer agent can be used in polymerization. Examples include mercapto compounds (e.g., dodecyl mercaptan and n-butyl mercaptan) and halogenated hydrocarbons (e.g., carbon tetrachloride, carbon tetrabromide, and benzyl chloride).

The acrylic resin as the coating resin may be a crosslinked polymer obtained by crosslinking the polymer (A1) with a crosslinking agent (A') containing a reactive functional group that reacts with the carboxyl group. The crosslinking agent (A') preferably includes a polyepoxy compound (a'1) (examples include polyglycidyl ethers (e.g., bisphenol A diglycidyl ether, propylene glycol diglycidyl ether, and glycerol triglycidyl ether) and polyglycidylamines (e.g., N,N-diglycidyl aniline and 1,3-bis(N,N-diglycidyl aminomethyl), and/or a polyol compound (a'2) (e.g., ethylene glycol)).

Examples of the method of crosslinking the polymer (A1) using the crosslinking agent (A') include one in which an electrode active material is coated with the polymer (A1) before crosslinking. Specifically, an electrode active material and a resin solution containing the polymer (A1) are mixed together and a solvent is removed from the mixture so as to produce a coated active material in which the electrode active material is coated with the polymer (A1). Then, a solution containing the crosslinking agent (A') is mixed with the coated electrode active material, and the mixture is heated to remove the solvent and initiate a crosslinking reaction, whereby a crosslinking reaction of the polymer (A1) by the crosslinking agent (A') occurs on the surface of the electrode active material.

The heating temperature is adjusted according to the type of the crosslinking agent. Yet, it is preferably 70° C. or higher when the crosslinking agent is the polyepoxy compound (a'1), and it is preferably 120° C. or higher when the crosslinking agent is the polyol compound (a'2).

The coating layer may further contain a conductive additive. It is particularly preferred that the coating layer for coating the positive electrode active material contains a conductive additive.

The conductive material is selected from materials having conductivity. Specific examples include carbon (such as graphite and carbon black (e.g., acetylene black, ketjen black, furnace black, channel black, and thermal lamp black)); carbon fibers, carbon nanofibers, and carbon nanotube such as PAN-based carbon fibers and pitch-based carbon fibers; and metals (e.g., nickel, aluminum, stainless steel (SUS), silver, copper, and titanium).

These conductive additives may be used alone or in combination of two or more thereof. Alloys or metal oxides thereof may also be used. In view of electrical stability, preferred are aluminum, stainless steel, carbon, silver, copper, titanium, and mixtures thereof, more preferred are silver, aluminum, stainless steel, and carbon, and particularly preferred is carbon. These conductive additives may be particulate ceramic materials or resin materials coated with conductive materials (metals among the conductive materials described above) by plating or the like. Polypropylene resin into which graphene has been kneaded is also preferred as a conductive additive.

The average particle size of the conductive additive is not limited. Yet, in view of electrical characteristics of the electrode for a lithium-ion battery, it is preferably 0.01 to 10 µm, more preferably 0.02 to 5 µm, still more preferably 0.03 to 1 µm. Herein, the particle size of the conductive additive refers to the largest distance L among distances between any two points on the outline of a particle of the conductive additive. The "average particle size of the conductive additive" can be determined as follows: particles are observed with a scanning electron microscope (SEM) or a transmission electron microscope (TEM), and the average of the particle sizes of the particles observed in several to several tens of viewing fields is calculated. The thus calculated value is defined as the average particle size.

The shape (form) of the conductive material is not limited to the particulate form and may be a different form. For example, the conductive additive may be fibrous.

Examples of the fibrous conductive additive include conductive fibers obtained by uniformly dispersing highly conductive metal or graphite in synthetic fibers; metal fibers obtained by making metal such as stainless steel into fibers; conductive fibers obtained by coating the surface of organic fibers with metal; and conductive fibers obtained by coating the surface of an organic fibers with a resin containing a conductive substance.

The average fiber diameter of the fibrous conductive additive is preferably 0.1 to 20 µm.

When the coating layer contains a conductive additive, the weight of the conductive additive contained in the coating layer is preferably 15 to 75 wt % relative to the total weight of the coating resin and the conductive additive.

The coating layer of the coated positive electrode active material preferably contains a conductive additive because even when an SEI film is formed on the surface of the electrode active material after pre-charging, a conduction path between the active materials can be maintained owing to the effect of the conductive additive contained in the coating layer, and an increase in resistance due to formation of the SEI film can be inhibited. It is more preferred when the conductive additive is contained in the above weight range because resistance can be easily inhibited.

The "unbound product" means that the position of each coated electrode active material is not irreversibly fixed by a binder.

In other words, the electrode active material layer does not contain a binder.

Examples of the binder include known binders for lithium-ion batteries such as starch, polyvinylidene fluoride, polyvinyl alcohol, carboxymethyl cellulose, polyvinylpyrrolidone, tetrafluoroethylene, styrene-butadiene rubber, polyethylene, polypropylene, and styrene-butadiene copolymers.

In the electrode active material layer of the electrode for a lithium-ion battery of the present invention, the position of each coated electrode active material is fixed by the viscous adhesive, but it is reversibly fixed because the electrode active material layer does not contain a binder. Thus, the coated electrode active materials can be separated without being destroyed, and the separated coated electrode active materials can be formed into an electrode active material molded body by re-compression.

An electrode active material layer in the conventional lithium-ion battery is produced by applying slurry in which electrode active material particles and a binder are dispersed in a solvent to a surface of a current collector or the like and thermally drying the slurry. Thus, the electrode active material layer is fixed by the binder. The electrode active materials are fixed together by the binder, and the position of each electrode active material particle is fixed. When the electrode active material layer is fixed by the binder, an excessive force is applied to the electrode active material particles due to expansion and contraction during charging and discharging, making the electrode active material particles easily destroyable.

Further, since the electrode active material layer is fixed by the binder to the surface of the electrode current collector, expansion and contraction of the electrode active material particles during charging and discharging may cause cracking in the electrode active material layer fixed by the binder, or the electrode active material layer may be separated or fall off from the surface of the current collector.

In the case of an unbound product of a mixture containing a coated electrode active material and a viscous adhesive, even when the coated electrode active materials come into contact with each other in an electrode active material layer, the coating resins are not irreversibly bonded together on the contact surface. The bond is temporary and the coated electrode active materials can be easily loosened without being destroyed. Thus, the coated electrode active materials are prevented from being fixed irreversibly together by the coating resin. Thus, in the electrode active material layer containing the unbound product of the mixture containing the coated electrode active material and the viscous adhesive, the coated electrode active material are not bound together.

The weight ratio of the coated electrode active material to the viscous adhesive (coated electrode active material/viscous adhesive) in the electrode for a lithium-ion battery is preferably 90/10 to 99.99/0.01, more preferably 95/5 to 99.9/0.1.

With the above weight ratio, the amount of the viscous adhesive is not excessive so that the energy density of the electrode is not low, and the electrode suitably exerts shape retainability owing to the viscous adhesive.

The electrode active material layer constituting the electrode for a lithium-ion battery preferably has a thickness of 150 µm or more, more preferably 200 µm or more, still more preferably 400 µm or more. Also, the thickness is preferably 2000 µm or less.

When thick electrode active material layers are assembled together to obtain a stacked battery, the proportion of these electrode active material layers in the battery is high, so that the battery can have a higher energy density.

Subsequently, the method of producing an electrode for a lithium-ion battery of the present invention is described.

The method of producing an electrode for a lithium-ion battery of the present invention includes: compressing a mixture of a coated electrode active material and a viscous adhesive for a lithium-ion electrode so as to form an electrode active material layer formed from an unbound product of the mixture containing the coated electrode active material and the viscous adhesive, the coated electrode active material including an electrode active material that occludes and releases lithium ions and a coating layer containing a coating resin on at least a portion of a surface of the electrode active material, the viscous adhesive for a lithium-ion electrode being a viscous adhesive that allows active materials to adhere to each other in a lithium-ion electrode, the viscous adhesive having a glass transition temperature of 60° C. or lower, a solubility parameter of 8 to 13 $(cal/cm^3)^{1/2}$, and a storage shear modulus and a loss shear modulus of $2.0 \times 10^3$ to $5.0 \times 10^7$ Pa as measured in a frequency range of $10^{-1}$ to $10^1$ Hz at 20° C., wherein the viscous adhesive is an acrylic polymer essentially containing a constituent unit derived from a (meth)acrylic acid alkyl ester monomer, the proportion of the (meth)acrylic acid alkyl ester monomer in monomers constituting the viscous adhesive is 50 wt % or more based on the total monomer weight, and the proportion of a fluorine-containing monomer is less than 3 wt % based on the total monomer weight.

The coated electrode active material can be obtained, for example, by dropping a resin solution containing the coating resin over 1 to 90 minutes into a universal mixer in which the electrode active material is being stirred at 30 to 50 rpm, and if necessary, a conductive additive is also added. While stirring, the temperature is raised to 50° C. to 200° C., and the pressure is reduced to 0.007 to 0.04 MPa, followed by standing for 10 to 150 minutes.

The viscous adhesive can be produced using the production method described above or the like.

The mixture of the coated electrode active material and the viscous adhesive can be prepared by mixing the coated electrode active material and the viscous adhesive by a known method.

The mixture does not contain the binder described above.

The mixture may contain a conductive material different from the conductive additive that is contained in the coating layer. A conductive material is preferably contained because it facilitates maintaining the conductive path between the active materials.

Examples of the conductive material are the same as those of the conductive additive contained in the coating layer, and preferred examples are also the same.

The mixture is preferably prepared such that the weight ratio of the coated electrode active material to the viscous adhesive (coated electrode active material/viscous adhesive) in the mixture is 90/10 to 99.99/0.01.

Preferably, the viscous adhesive for use in the method of producing an electrode for a lithium-ion battery of the present invention contains two or more (meth)acrylic acid alkyl ester monomers as constituent monomers, and the total content of these monomers is 50 wt % or more based on the total constituent monomer weight.

The viscous adhesive may contain, as a constituent monomer, a monovinyl monomer copolymerizable with the (meth)acrylic acid alkyl ester monomers.

Preferably, the viscous adhesive contains a (meth)acrylic acid monomer as a constituent monomer.

In the method of producing an electrode for a lithium-ion battery of the present invention, the mixture is compressed to form an electrode active material layer.

Examples of the method of forming the electrode active material layer by compression include compression molding in which a mixture is injected into a mold and compression-molded, extrusion molding, and calendering (rolling).

The electrode active material layer to be formed preferably has a thickness of 150 µm or more, more preferably 200 µm or more, still more preferably 400 µm or more. Also, the thickness is preferably 2000 µm or less.

Compression molding can be carried out using any pressing device such as a hydraulic pressing device and a pressing jig. For example, a mixture is placed in a cylindrical bottomed container, a round rod-shaped pressing jig having a diameter slightly smaller than the inside diameter of the cylinder is inserted into the cylinder, and the mixture is compressed by the pressing device, whereby a molded body having a cylindrical shape is obtained.

The shape of the molded body to be produced preferably has a thickness of 150 µm or more.

When the molded body has a cylindrical shape, the diameter is preferably 10 to 70 mm.

A molded body having any desired shape can be obtained by changing the shape of the pressing jig.

With regard to compression conditions for compression molding, the pressure to be applied to the mixture is preferably 40 to 3000 MPa. The pressure time is preferably 1 to 300 seconds.

Compression molding may be carried out on a current collector. Compression molding of the mixture placed on a current collector results in an electrode active material layer on the current collector.

The electrode active material layer obtained on the current collector in combination with the current collector can be used as the electrode for a lithium-ion battery.

Examples of materials constituting the positive electrode current collector as a current collector include copper, aluminum, titanium, stainless steel, nickel, baked carbon, conductive polymers, and conductive glass. Alternatively, the positive electrode current collector may be a resin current collector formed from a conducting agent and a resin.

Examples of materials constituting the negative electrode current collector as a current collector include metal materials such as copper, aluminum, titanium, stainless steel, nickel, and alloys thereof. Particularly preferred is copper in view of lightweight, corrosion resistance, and high conductivity. The negative electrode current collector may be a current collector formed from baked carbon, a conductive polymer, or conductive glass; or a resin current collector formed from a conducting agent and a resin.

For both the positive electrode current collector and the negative electrode current collector, preferred examples of the conducting agent constituting the resin current collector are the same as those of the conductive material that is contained as a optional component in the mixture.

Examples of resins constituting the resin current collector include polyethylene (PE), polypropylene (PP), polymethylpentene (PMP), polycycloolefin (PCO), polyethylene terephthalate (PET), polyether nitrile (PEN), polytetrafluoroethylene (PTFE), styrene butadiene rubber (SBR), polyacrylonitrile (PAN), poly(methyl acrylate) (PMA), poly (methyl methacrylate) (PMMA), polyvinylidene fluoride (PVdF), epoxy resin, silicone resin, and mixtures thereof.

In view of electrical stability, polyethylene (PE), polypropylene (PP), polymethylpentene (PMP), and polycycloolefin (PCO) are preferred, and polyethylene (PE), polypropylene (PP), and polymethylpentene (PMP) are more preferred.

Examples of the method of obtaining an electrode composition molded body by extrusion molding include one that uses a known extruder.

The extruder may be one including a feeding tube through which a raw material is fed, a die (also referred to as a "mold") attached to the raw material discharge side of the feeding tube, and a rotating shaft screw that extrudes the raw material placed in the feeding tube into the die.

A mixture is fed into the feeding tube, and the mixture that was moved through the feeding tube by rotation of the screw is extruded from the die, whereby a tubular molded body can be obtained. The shape of the molded body can be suitably adjusted by adjusting the shape of the die and the rotation speed of the screw.

The shape of the tubular molded body discharged from the die is not limited, but it is preferably a cylindrical shape or a quadrangular prism shape. The tubular molded body discharged from the die is cut into a predetermined length, whereby an electrode having an electrode active material layer is obtained.

Examples of the method of obtaining an electrode composition molded body by calendering include one that uses a known roll pressing machine.

A mixture is fed from a continuous mixer such as a kneader; the mixture is spread to a certain thickness on a smooth surface such as a film by a doctor blade or the like; and the mixture is roll-pressed, whereby a molded sheet can be obtained. The molded sheet is cut into a predetermined length, whereby an electrode having an electrode active material layer is obtained.

An electrode for a lithium-ion battery having an electrode active material layer can be produced through the above steps.

The electrode active material layer obtained through the above steps was produced without using a binder, and the production thereof does not include a step of solidifying a mixture by heating or the like. Regardless, it is possible to maintain the shape of the electrode due to adequate shape retainability provided by the viscous adhesive to the coating resin contained in the coating layer of the coated electrode active material.

In the production of the lithium-ion battery, preferably, the electrode for a lithium-ion battery produced by the method of producing an electrode for a lithium-ion battery of the present invention is accommodated with a separator in a cell case, and an electrolyte solution is injected into the cell case to immerse the electrode active material layer in the electrolyte solution.

Both a positive electrode for a lithium-ion battery and a negative electrode for a lithium-ion battery, which are produced by the method of producing an electrode for a lithium-ion battery of the present invention, may be used as the electrode active material layers to be accommodated in the cell case, or only one of them may be used as one of the electrode active material layers.

When only one of them is used, a known counter electrode can be used as the electrode on the opposite side.

The electrode for a lithium-ion battery obtained by the present invention maintains a constant shape. Thus, the electrode is easy to handle, and is easily accommodated into a cell case of the electrode for a lithium-ion battery.

Also, as described above, when the electrode active material layer was obtained on the current collector, the electrode active material layer in combination with the current collector can be used as an electrode to produce a lithium-ion battery.

Examples of the separator include known separators for lithium-ion batteries such as porous films made of polyethylene or polypropylene; multilayer films consisting of a porous polyethylene film and a porous polypropylene film; non-woven fabric made of synthetic fibers (e.g., polyester fibers and aramid fibers), or glass fibers; and separators with ceramic fine particles such as silica, alumina, or titania particles attached to the surface thereof.

The electrolyte solution may be one containing an electrolyte and a non-aqueous solvent, which is used in the production of a lithium-ion battery.

The electrolyte may be one that is used in a known electrolyte solution. Preferred examples include electrolytes containing lithium salts of inorganic acids such as $LiPF_6$, $LiBF_4$, $LiSbF_6$, $LiAsF_6$, and $LiClO_4$; sulfonylimide-based electrolytes containing fluorine atoms such as $LiN(FSO_2)_2$, $LiN(CF_3SO_2)_2$, and $LiN(C_2F_5SO_2)_2$; and sulfonylmethide-based electrolytes containing fluorine atoms such as $LiC(CF_3SO_2)_3$.

A non-aqueous solvent for the electrolyte solution to be injected is preferably an aprotic solvent.

The aprotic solvent is a solvent free of hydrogen ion donor groups (groups having dissociative hydrogen atoms, such as amino, hydroxy, and thio groups). Solvents that can be preferably used are lactone compounds, cyclic or acyclic carbonate esters, acyclic carboxylate esters, cyclic or acyclic ethers, phosphate esters, nitrile compounds, amide compounds, sulfones, and mixtures thereof. More preferred solvents are cyclic carbonate esters, acyclic carbonate esters, and mixtures of cyclic carbonate esters and acyclic carbonate esters.

Examples of the lactone compounds include 5-membered lactone compounds (such as γ-butyrolactone and γ-valerolactone) and 6-membered lactone compounds (such as δ-valerolactone).

Examples of the cyclic carbonate esters include propylene carbonate, ethylene carbonate, butylene carbonate, and vinylene carbonate.

Examples of the acyclic carbonate esters include dimethyl carbonate, methyl ethyl carbonate, diethyl carbonate, methyl-n-propyl carbonate, ethyl-n-propyl carbonate, and di-n-propyl carbonate.

Examples of the acyclic carboxylate esters include methyl acetate, ethyl acetate, propyl acetate, and methyl propionate.

Examples of the cyclic ethers include tetrahydrofuran, tetrahydropyran, 1,3-dioxolan, and 1,4-dioxane.

Examples of the acyclic ethers include dimethoxymethane and 1,2-dimethoxyethane.

Examples of the phosphate esters include trimethyl phosphate, triethyl phosphate, ethyl dimethyl phosphate, diethyl methyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphospholan-2-one, 2-trifluoroethoxy-1,3,2-dioxaphospholan-2-one, and 2-methoxyethoxy-1,3,2-dioxaphospholan-2-one.

Examples of the nitrile compounds include acetonitrile. Examples of the amide compounds include N,N-dimethylformamide (hereinafter also referred to as "DMF"). Examples of the sulfone include acyclic sulfones such as dimethyl sulfone and diethyl sulfone and cyclic sulfones such as sulfolane.

These aprotic solvents may be used alone or in combination of two or more thereof.

The electrolyte concentration in the electrolyte solution is preferably 0.3 to 3 M, in view of battery characteristics at low temperatures and the like.

In the method of producing an electrode for a lithium-ion battery of the present invention, it is also preferred that the mixture is an electrolyte solution-containing mixture that further contains an electrolyte solution and the electrolyte solution-containing mixture is compressed to form an electrode active material layer.

The electrolyte solution contained in the electrolyte solution-containing mixture can be the electrolyte solution described above.

The electrolyte solution contained in the electrolyte solution-containing mixture is particularly preferably an electrolyte solution containing a solvent that contains ethylene carbonate, more preferably an electrolyte solution containing a mixed solvent of ethylene carbonate and diethyl carbonate.

This method can produce an electrode containing an electrolyte solution by a simple process.

EXAMPLES

Next, the present invention is specifically described with reference to examples, but the present invention is not limited to these examples as long as the modifications do not depart from the gist of the present invention. The "part(s)" and "%" refer to part(s) by weight and % by weight, respectively, unless otherwise specified.

Example 1: Production of Viscous Adhesive (B1)

A four-necked flask equipped with a stirrer, a thermometer, a reflux condenser, a dripping funnel, and a nitrogen gas inlet tube was charged with vinyl acetate (5.0 parts), 2-ethylhexyl acrylate (23.7 parts), and ethyl acetate (185.5 parts), and the temperature was raised to 75° C. Vinyl acetate (11.1 parts), 2-ethylhexyl acrylate (21.0 parts), 2-hydroxyethyl methacrylate (28.1 parts), acrylic acid (11.1 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued at the boiling point for 2 hours, followed by addition of ethyl acetate (702.4 parts), whereby a solution of a viscous adhesive (B1) having a resin concentration of 10 wt % was obtained. GPC measurement of the molecular weight of the viscous adhesive (B1) found that the viscous adhesive (B1) had a weight average molecular weight (hereinafter abbreviated to "Mw") of 420,000. Mw measurement conditions were as described above. For each resulting polymer (viscous adhesive), the polymerization conversion rate and the amount of an unreacted monomer were measured and the composition of the unreacted monomers was analyzed so as to measure the amount of each monomer unit constituting the polymer. The results show that the proportions of the monomers in the polymer are the same as the proportions of these monomers used as the raw materials (the same applies in the examples and comparative examples described later).

Examples 2 to 4: Production of Viscous Adhesives (B2) to (B4)

Solutions of viscous adhesives (B2) to (B4) were obtained as in Example 1 except that the amounts of vinyl acetate, 2-ethylhexyl acrylate, 2-hydroxyethyl methacrylate, and acrylic acid were changed as shown in Table 1. Table 1 shows Mw of each of the viscous adhesives (B2) to (B4), together with the result of the viscous adhesive (B1) obtained in Example 1. The viscous adhesives having different Mw were obtained in Examples 1 and 2, by changing the amount of the polymerization initiator.

Example 5: Production of Viscous Adhesive (B5)

A four-necked flask equipped with a stirrer, a thermometer, a reflux condenser, a dripping funnel, and a nitrogen gas inlet tube was charged with n-butyl acrylate (40 parts), toluene (120 parts), and ethyl acetate (40 parts), and the temperature was raised to 75° C. Methyl acrylate (20 parts), n-butyl acrylate (30 parts), 2-hydroxyethyl acrylate (5 parts), acrylic acid (5 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (702.4 parts), whereby a solution of a viscous adhesive (B5) having a resin concentration of 10 wt % was obtained. The viscous adhesive (B5) had a molecular weight Mw of 390,000 as measured by GPC. Mw measurement conditions were as described above.

Example 6: Production of Viscous Adhesive (B6)

A four-necked flask equipped with a stirrer, a thermometer, a reflux condenser, a dripping funnel, and a nitrogen gas inlet tube was charged with n-butyl acrylate (30 parts), vinyl acetate (10 parts), toluene (120 parts), and ethyl acetate (40 parts), and the temperature was raised to 75° C. Methyl acrylate (30 parts), 2-hydroxyethyl methacrylate (5 parts), n-butyl acrylate (20 parts), acrylic acid (5 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (727 parts), whereby a solution of a viscous adhesive (B6) having a resin concentration of 10 wt % was obtained. The viscous adhesive (B6) had a molecular weight Mw of 410,000 as measured by GPC. Mw measurement conditions were as described above.

Example 7: Production of Viscous Adhesive (B7)

A four-necked flask equipped with a stirrer, a thermometer, a reflux condenser, a dripping funnel, and a nitrogen gas inlet tube was charged with n-butyl acrylate (50 parts), toluene (150 parts), and ethyl acetate (50 parts), and the temperature was raised to 75° C. Methyl methacrylate (20 parts), 2-hydroxyethyl methacrylate (5 parts), n-butyl acrylate (20 parts), acrylic acid (5 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (708 parts), whereby a solution of a viscous adhesive (B7) having a resin concentration of 10 wt % was obtained. The viscous adhesive (B7) had a molecular weight Mw of 400,000 as measured by GPC. Mw measurement conditions were as described above.

Example 8: Production of Viscous Adhesive (B8)

A four-necked flask equipped with a stirrer, a thermometer, a reflux condenser, a dripping funnel, and a nitrogen gas inlet tube was charged with n-butyl acrylate (40 parts), toluene (120 parts), and ethyl acetate (40 parts), and the temperature was raised to 75° C. Methyl methacrylate (30 parts), 2-hydroxyethyl acrylate (15 parts), n-butyl acrylate (10 parts), acrylic acid (5 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (730 parts), whereby a solution of a viscous adhesive (B8) having a resin concentration of 10 wt % was obtained. The viscous adhesive (B8) had a molecular weight Mw of 390,000 as measured by GPC. Mw measurement conditions were as described above.

Example 9: Production of Viscous Adhesive (B9)

A four-necked flask equipped with a stirrer, a thermometer, a reflux condenser, a dripping funnel, and a nitrogen gas inlet tube was charged with n-butyl acrylate (40 parts), toluene (120 parts), and ethyl acetate (40 parts), and the temperature was raised to 75° C. Methyl acrylate (30 parts), 2-hydroxyethyl methacrylate (15 parts), n-butyl acrylate (10 parts), methacrylic acid (5 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (730 parts), whereby a solution of a viscous adhesive (B9) having a resin concentration of 10 wt % was obtained. The viscous adhesive (B9) had a molecular weight Mw of 430,000 as measured by GPC. Mw measurement conditions were as described above.

Example 10: Production of Viscous Adhesive (B10)

A four-necked flask equipped with a stirrer, a thermometer, a reflux condenser, a dripping funnel, and a nitrogen gas inlet tube was charged with vinyl acetate (10 parts), n-butyl acrylate (40 parts), toluene (150 parts), and ethyl acetate (50 parts), and the temperature was raised to 75° C. Methyl methacrylate (5 parts), vinyl acetate (15 parts), 2-hydroxyethyl methacrylate (10 parts), n-butyl acrylate (20 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis (2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (688 parts), whereby a solution of a viscous adhesive (B10) having a resin concentration of 10 wt % was obtained. The viscous adhesive (B10) had a molecular weight Mw of 440,000 as measured by GPC. Mw measurement conditions were as described above.

Example 11: Production of Viscous Adhesive (B11)

A four-necked flask equipped with a stirrer, a thermometer, a reflux condenser, a dripping funnel, and a nitrogen gas inlet tube was charged with n-butyl acrylate (40 parts), toluene (120 parts), and ethyl acetate (40 parts), and the temperature was raised to 75° C. Methyl acrylate (30 parts), 2-hydroxyethyl acrylate (15 parts), methacrylic acid (5 parts), n-butyl acrylate (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in ethyl acetate (12.4 parts) was continuously added using the dripping funnel after 6 to 8 hours from the beginning of polymerization. The polymerization was further continued for 2 hours, followed by addition of ethyl acetate (728 parts), whereby a solution of a viscous adhesive (B11) having a resin concentration of 10 wt % was obtained. The viscous adhesive (B11) had a molecular weight Mw of 410,000 as measured by GPC. Mw measurement conditions were as described above.

Example 12: Production of Viscous Adhesive (B12)

A four-necked flask equipped with a stirrer, a thermometer, a reflux condenser, a dripping funnel, and a nitrogen gas inlet tube was charged with n-butyl acrylate (39 parts), 2-ethylhexyl methacrylate (60 parts), 1,6-hexanediol dimethacrylate (1 part), and toluene (390 parts), and the temperature was raised to 75° C. Toluene (10 parts), 2,2'-azobis (2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B12) having a resin concentration of 10 wt % was obtained. The viscous adhesive (B12) had a molecular weight Mw of 510,000 as measured by GPC. Mw measurement conditions were as described above.

Example 13: Production of Viscous Adhesive (B13)

A four-necked flask equipped with a stirrer, a thermometer, a reflux condenser, a dripping funnel, and a nitrogen gas inlet tube was charged with n-butyl acrylate (9.5 parts), 2-ethylhexyl methacrylate (90 parts), 1,6-hexanediol dimethacrylate (0.5 parts), and toluene (390 parts), and the temperature was raised to 75° C. Toluene (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B13) having a resin concentration of 10 wt % was obtained. The viscous adhesive (B13) had a molecular weight Mw of 440,000 as measured by GPC. Mw measurement conditions were as described above.

Example 14: Production of Viscous Adhesive (B14)

A four-necked flask equipped with a stirrer, a thermometer, a reflux condenser, a dripping funnel, and a nitrogen gas inlet tube was charged with iso-butyl methacrylate (85 parts), methyl methacrylate (14.5 parts), 1,6-hexanediol dimethacrylate (0.5 parts), and toluene (390 parts), and the temperature was raised to 75° C. Toluene (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B14) having a resin concentration of 10 wt % was obtained. The viscous adhesive (B14) had a molecular weight Mw of 440,000 as measured by GPC. Mw measurement conditions were as described above.

Example 15: Production of Viscous Adhesive (B15)

A four-necked flask equipped with a stirrer, a thermometer, a reflux condenser, a dripping funnel, and a nitrogen gas inlet tube was charged with 2-ethylhexyl methacrylate (50 parts), AK-5 (Toagosei Co., Ltd., 50 parts), and toluene (390 parts), and the temperature was raised to 75° C. Toluene (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B15) having a resin concentration of 10 wt % was obtained. The viscous adhesive (B15) had a molecular weight Mw of 420,000 as measured by GPC. Mw measurement conditions were as described above.

Example 16: Production of Viscous Adhesive (B16)

A four-necked flask equipped with a stirrer, a thermometer, a reflux condenser, a dripping funnel, and a nitrogen gas inlet tube was charged with n-butyl acrylate (30 parts), 2-hydroxyethyl acrylate (20 parts), acrylonitrile (50 parts), and toluene (390 parts), and the temperature was raised to 75° C. Toluene (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B16) having a resin concentration of 10 wt % was obtained. The viscous adhesive (B16) had a molecular weight Mw of 460,000 as measured by GPC. Mw measurement conditions were as described above.

Example 17: Production of Viscous Adhesive (B17)

To a polymerization vessel were added water (250 parts), 2,2,2-trifluoroethyl methacrylate (2 parts), 2-ethylhexyl methacrylate (90 parts), acrylic acid (5 parts), ethylene glycol dimethacrylate (3 parts), sodium dodecylbenzenesulfonate (2 parts), and potassium persulfate (0.3 parts) to carry out polymerization at 80° C. for 14 hours. Here, the polymerization conversion rate was 96%. After reaction, the temperature was cooled to room temperature, and a 10% aqueous ammonia solution was added to adjust pH to 7, whereby polymer latex was obtained. The resulting polymer had an average particle size of 100 nm. The latex was used directly as a viscous adhesive (B17). The viscous adhesive (B17) had a molecular weight Mw of 440,000 as measured by GPC. Mw measurement conditions were as described above.

Comparative Example 1: Production of Viscous Adhesive (B18)

A four-necked flask equipped with a stirrer, a thermometer, a reflux condenser, a dripping funnel, and a nitrogen gas inlet tube was charged with DMF (45.0 parts), and the temperature was raised to 75° C. Subsequently, a monomer mixture containing acrylic acid (10 parts), n-butyl acrylate (10 parts), methyl methacrylate (80 parts), and DMF (39.6 parts), and an initiator solution containing 2,2'-azobis(2,4-dimethylvaleronitrile) (0.09 parts) and 2,2'-azobis(2-methylbutyronitrile) (0.15 parts) dissolved in DMF (5.0 parts) were continuously dropped through the dripping funnel over 1.5 hours under stirring while nitrogen was blown into the four-necked flask to carry out radical polymerization. After completion of dropping, the temperature was raised to 80° C., and the reaction was continued for 5 hours. Subsequently, an initiator solution containing 2,2'-azobis(2-methylbutyronitrile) (0.03 parts) dissolved in DMF (5.0 parts) was added, and the temperature was raised to 85° C. to continue the reaction for additional 3 hours, followed by addition of DMF (115.0 parts), whereby a solution of a viscous adhesive (B18) having a resin concentration of 30 wt % was obtained. The viscous adhesive (B18) had a molecular weight Mw of 510,000 as measured by GPC. Mw measurement conditions were as described above.

Comparative Example 2: Production of Viscous Adhesive (B19)

A four-necked flask equipped with a stirrer, a thermometer, a reflux condenser, a dripping funnel, and a nitrogen gas inlet tube was charged with 2-ethylhexyl methacrylate (10 parts), AK-5 (Toagosei Co., Ltd.) (90 parts), and toluene (390 parts), and the temperature was raised to 75° C. Toluene (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B19) having a resin concentration of 10 wt % was obtained. The viscous adhesive (B19) had a molecular weight Mw of 450,000 as measured by GPC. Mw measurement conditions were as described above.

Comparative Example 3: Production of Viscous Adhesive (B20)

A four-necked flask equipped with a stirrer, a thermometer, a reflux condenser, a dripping funnel, and a nitrogen gas inlet tube was charged with n-butyl acrylate (20 parts), acrylonitrile (80 parts), and toluene (390 parts), and the temperature was raised to 75° C. Toluene (10 parts), 2,2'-azobis(2,4-dimethylvaleronitrile) (0.200 parts), and 2,2'-azobis(2-methylbutyronitrile) (0.200 parts) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B20) having a resin concentration of 10 wt % was obtained. The viscous adhesive (B20) had a molecular weight Mw of 410,000 as measured by GPC. Mw measurement conditions were as described above.

Comparative Example 4: Production of Viscous Adhesive (B21)

A four-necked flask equipped with a stirrer, a thermometer, a reflux condenser, a dripping funnel, and a nitrogen gas inlet tube was charged with DMF (45.0 parts), and the temperature was raised to 75° C. Subsequently, a monomer mixture containing acrylic acid (5 parts), methyl methacrylate (95 parts), and DMF (39.6 parts), and an initiator solution containing 2,2'-azobis(2,4-dimethylvaleronitrile) (0.09 parts) and 2,2'-azobis(2-methylbutyronitrile) (0.15 parts) dissolved in DMF (5.0 parts) were continuously dropped through the dripping funnel over 1.5 hours under stirring while nitrogen was blown into the four-necked flask to carry out radical polymerization. After completion of dropping, the temperature was raised to 80° C., and the reaction was continued for 5 hours. Subsequently, an initiator solution containing 2,2'-azobis(2-methylbutyronitrile) (0.03 parts) dissolved in DMF (5.0 parts) was added, and the temperature was raised to 85° C. to continue the reaction for additional 3 hours, followed by addition of DMF (115.0 parts), whereby a solution of a viscous adhesive (B21) having a resin concentration of 30 wt % was obtained. The viscous adhesive (B21) had a molecular weight Mw of 480,000 as measured by GPC. Mw measurement conditions were as described above.

Comparative Example 5: Production of Viscous Adhesive (B22)

A four-necked flask equipped with a stirrer, a thermometer, a reflux condenser, a dripping funnel, and a nitrogen gas inlet tube was charged with n-butyl acrylate (0.5 parts), 2-ethylhexyl acrylate (99.5 parts), and toluene (390 parts), and the temperature was raised to 75° C. Toluene (10 parts), 2,2'-azobis(2,4-dimethylvaleronitrile) (1.000 part), and 2,2'-azobis(2-methylbutyronitrile) (1.000 part) were added to the flask. The resulting monomer mixture was continuously dropped through the dripping funnel over 4 hours while nitrogen was blown into the flask to carry out radical polymerization. After completion of dropping, a solution containing 2,2'-azobis(2,4-dimethylvaleronitrile) (0.800 parts) dissolved in toluene (12.4 parts) was continuously added using the dripping funnel after 6 to 8 hours from the beginning of polymerization. The polymerization was further continued for 2 hours, followed by addition of toluene (488 parts), whereby a solution of a viscous adhesive (B22) having a resin concentration of 10 wt % was obtained. The viscous adhesive (B22) had a molecular weight Mw of 12,000 as measured by GPC. Mw measurement conditions were as described above.

Comparative Example 6: Production of Viscous Adhesive (B23)

To a polymerization vessel were added water (250 parts), 2,2,2-trifluoroethyl methacrylate (4 parts), 2-ethylhexyl methacrylate (88 parts), acrylic acid (5 parts), ethylene glycol dimethacrylate (3 parts), sodium dodecylbenzenesulfonate (2 parts), and potassium persulfate (0.3 parts) to carry out polymerization at 80° C. for 14 hours. Here, the polymerization conversion rate was 96%. After reaction, the temperature was cooled to room temperature, and a 10% aqueous ammonia solution was added to adjust pH to 7, whereby polymer latex was obtained. The resulting polymer had an average particle size of 100 nm. The latex was used directly as a viscous adhesive (B23). The viscous adhesive (B23) had a molecular weight Mw of 440,000 as measured by GPC. Mw measurement conditions were as described above.

The resulting viscous adhesives (B1) to (B23) were subjected to measurement of Tg, storage shear modulus, and loss shear modulus by the following methods. The SP value of each viscous adhesive was calculated according to an article "Polymer Engineering and Science" (February, 1974, Vol. 14, No. 2, Robert F. Fedors, pp. 147 to 154). Table 1 shows the results.

Tg Measurement Method:

Tg is measured by a method (DSC method) defined in ASTM D3418-82 using DSC20 and SSC/580 available from Seiko EG&G Co., Ltd.

Storage Shear Modulus and Loss Shear Modulus Measurement Method:

The storage shear modulus and loss shear modulus were determined by molding the viscous adhesive (0.8 g) with a pressure of 30 MPa using a φ20-mm die and measuring the molded viscous adhesive using a φ20-mm parallel cone in Advanced Rheometric Expansion System available from TA Instruments, under the following conditions: frequency of 0.1 to 10 Hz ($10^{-1}$ to $10^1$ Hz), temperature of 20° C., and strain of 0.1% (automated strain control; allowable minimum stress: 1.0 g/cm; allowable maximum stress: 500 g/cm; maximum additional strain: 200%; strain adjustment: 200%).

When the storage shear modulus G' and loss shear modulus G" measured in the frequency range of $10^{-1}$ to $10^1$ Hz at 20° C. were in the range of $2.0\times10^3$ to $5.0\times10^7$ Pa, it was indicated as "Good" in Table 1. When these moduli were out of the range, it was indicated as "Poor".

TABLE 1

| | Polymer | PVAc | 2-EHA | 2-EHMA | HEMA | HEA | MAA | AA | iso-BMA | n-BA | MMA | AM | 1,6-HDDMA | EGDMA |
|---|---|---|---|---|---|---|---|---|---|---|---|---|---|---|
| Example 1 | Viscous adhesive B1 | 16.1 | 44.7 | | 28.1 | | | 11.1 | | | | | | |
| Example 2 | Viscous adhesive B2 | 16.1 | 44.7 | | 28.1 | | | 11.1 | | | | | | |
| Example 3 | Viscous adhesive B3 | 20.3 | 44.7 | | 29.9 | | | 5.1 | | | | | | |
| Example 4 | Viscous adhesive B4 | 16.1 | 30.2 | | 38.2 | | | 15.5 | | | | | | |
| Example 5 | Viscous adhesive B5 | | | | | 5 | | 5 | | 70 | 20 | | | |
| Example 6 | Viscous adhesive B6 | 10 | | | 5 | | | 5 | | 50 | 30 | | | |
| Example 7 | Viscous adhesive B7 | | | | 5 | | | 5 | | 70 | 20 | | | |
| Example 8 | Viscous adhesive B8 | | | | | 15 | | 5 | | 50 | 30 | | | |
| Example 9 | Viscous adhesive B9 | | | | | 15 | 5 | | | 50 | 30 | | | |
| Example 10 | Viscous adhesive B10 | 25 | | | 10 | | | | | 60 | 5 | | | |
| Example 11 | Viscous adhesive B11 | | | | | 15 | 5 | | | 50 | 30 | | | |
| Example 12 | Viscous adhesive B12 | | | 60 | | | | | | 39 | | | 1 | |
| Example 13 | Viscous adhesive B13 | | | 90 | | | | | | 9.5 | | | 0.5 | |
| Example 14 | Viscous adhesive B14 | | | | | | | | 85 | 14.5 | | | 0.5 | |
| Example 15 | Viscous adhesive B15 | | | 50 | | | | | | | | | | |
| Example 16 | Viscous adhesive B16 | | | | | 20 | | | | 30 | | | | |
| Example 17 | Viscous adhesive B17 | | | 90 | | | 5 | | | | | | | 3 |
| Comparative Example 1 | Viscous adhesive B18 | | | | | | | 10 | 10 | | 80 | | | |
| Comparative Example 2 | Viscous adhesive B19 | | | 10 | | | | | | | | | | |
| Comparative Example 3 | Viscous adhesive B20 | | | | | | | | | 20 | | | | |

TABLE 1-continued

| | Polymer | AK-5 | TFMA | ACN | Proportion of (methyl)acrylic acid alkyl ester | Proportion of fluorine-containing monomer (wt %) | Tg (° C.) | SP value | G' (20° C., Pa) 0.1 to 10 Hz | G' evaluation | G" (20° C., Pa) 0.1 to 10 Hz | G" evaluation | Mw |
|---|---|---|---|---|---|---|---|---|---|---|---|---|---|
| Comparative Example 4 | Viscous adhesive B21 | | | | 5 | 95 | | | | | | | |
| Comparative Example 5 | Viscous adhesive B22 | 99.5 | | | | 0.5 | | | | | | | |
| Comparative Example 6 | Viscous adhesive B23 | | 88 | | 5 | | | | | | | 3 | |
| Example 1 | Viscous adhesive B1 | | | | 78.2 | 0 | −10 | 11.0 | 9.1 × 10^4 to 8.9 × 10^5 | Good | 7.1 × 10^4 to 9.2 × 10^5 | Good | 420,000 |
| Example 2 | Viscous adhesive B2 | | | | 78.2 | 0 | −10 | 11.0 | 3.5 × 10^4 to 5.4 × 10^5 | Good | 3.2 × 10^4 to 6.9 × 10^5 | Good | 160,000 |
| Example 3 | Viscous adhesive B3 | | | | 74.6 | 0 | −13 | 10.9 | 7.1 × 10^4 to 8.5 × 10^5 | Good | 5.5 × 10^4 to 1.0 × 10^6 | Good | 450,000 |
| Example 4 | Viscous adhesive B4 | | | | 68.2 | 0 | | 11.7 | 2.1 × 10^5 to 2.4 × 10^6 | Good | 8.2 × 10^5 to 3.3 × 10^6 | Good | 480,000 |
| Example 5 | Viscous adhesive B5 | | | | 95 | 0 | −37 | 10.3 | 1.7 × 10^5 to 2.5 × 10^6 | Good | 1.5 × 10^5 to 4.2 × 10^6 | Good | 390,000 |
| Example 6 | Viscous adhesive B6 | | | | 85 | 0 | −20 | 10.4 | 4.1 × 10^5 to 5.5 × 10^6 | Good | 3.5 × 10^5 to 6.0 × 10^6 | Good | 410,000 |
| Example 7 | Viscous adhesive B7 | | | | 95 | 0 | | 10.2 | 2.6 × 10^5 to 3.1 × 10^6 | Good | 3.0 × 10^5 to 3.9 × 10^6 | Good | 400,00 |
| Example 8 | Viscous adhesive B8 | | | | 95 | 0 | −10 | 10.8 | 3.2 × 10^5 to 5.5 × 10^6 | Good | 2.5 × 10^5 to 4.9 × 10^6 | Good | 390,000 |
| Example 9 | Viscous adhesive B9 | | | | 95 | 0 | −15 | 10.7 | 5.5 × 10^5 to 7.4 × 10^6 | Good | 4.5 × 10^5 to 8.6 × 10^6 | Good | 430,000 |
| Example 10 | Viscous adhesive B10 | | | | 75 | 0 | −22 | 10.8 | 1.5 × 10^5 to 2.5 × 10^6 | Good | 1.4 × 10^5 to 3.2 × 10^6 | Good | 440,000 |
| Example 11 | Viscous adhesive B11 | | | | 95 | 0 | −25 | 10.7 | 4.0 × 10^5 to 5.3 × 10^6 | Good | 4.2 × 10^5 to 6.1 × 10^6 | Good | 410,000 |
| Example 12 | Viscous adhesive B12 | | | | 100 | 0 | −23 | 9.3 | 5.5 × 10^5 to 7.4 × 10^6 | Good | 4.4 × 10^5 to 8.0 × 10^6 | Good | 510,000 |
| Example 13 | Viscous adhesive B13 | | | | 100 | 0 | −19 | 9.1 | 5.1 × 10^5 to 7.0 × 10^6 | Good | 6.0 × 10^5 to 8.2 × 10^6 | Good | 440,000 |
| Example 14 | Viscous adhesive B14 | | | | 100 | 0 | 57 | 9.8 | 3.2 × 10^6 to 4.1 × 10^7 | Good | 9.5 × 10^6 to 4.0 × 10^7 | Good | 440,000 |
| Example 15 | Viscous adhesive B15 | 50 | | | 50 | 0 | −82 | 8.3 | 2.9 × 10^3 to 6.2 × 10^4 | Good | 2.6 × 10^3 to 1.2 × 10^4 | Good | 420,000 |
| Example 16 | Viscous adhesive B16 | | | 50 | 50 | 0 | 16 | 12.7 | 8.5 × 10^6 to 1.1 × 10^7 | Good | 6.0 × 10^6 to 8.6 × 10^7 | Good | 460,000 |
| Example 17 | Viscous adhesive B17 | | 2 | | 93 | 2 | 4 | 9.2 | 6.3 × 10^5 to 8.1 × 10^6 | Good | 5.4 × 10^5 to 9.0 × 10^6 | Good | 440,000 |
| Comparative Example 1 | Viscous adhesive B18 | | | | 90 | 0 | 74 | 10.3 | 5.0 × 10^6 to 4.7 × 10^7 | Good | 4.2 × 10^6 to 4.6 × 10^7 | Good | 510,000 |
| Comparative Example 2 | Viscous adhesive B19 | 90 | | | 10 | 0 | −116 | 7.7 | 2.5 × 10^3 to 5.1 × 10^4 | Good | 2.4 × 10^3 to 8.2 × 10^4 | Good | 450,000 |
| Comparative Example 3 | Viscous adhesive B20 | | | 80 | 20 | 0 | 56 | 13.5 | 2.4 × 10^6 to 3.8 × 10^7 | Good | 1.5 × 10^6 to 2.5 × 10^7 | Good | 410,000 |

TABLE 1-continued

| | | | | | | | | | | |
|---|---|---|---|---|---|---|---|---|---|---|
| Comparative Example 4 | Viscous adhesive B21 | | 95 | 0 | 105 | 10.1 | $8.0 \times 10^{6}$ to $5.9 \times 10^{7}$ | Poor | $6.5 \times 10^{6}$ to $5.7 \times 10^{7}$ | Poor | 480,000 |
| Comparative Example 5 | Viscous adhesive B22 | | 100 | 0 | −70 | 9.2 | $1.5 \times 10^{3}$ to $4.4 \times 10^{4}$ | Poor | $1.7 \times 10^{3}$ to $6.4 \times 10^{4}$ | Poor | 12,000 |
| Comparative Example 6 | Viscous adhesive B23 | 4 | 91 | 4 | 6 | 9.2 | $6.7 \times 10^{5}$ to $7.8 \times 10^{6}$ | Good | $5.5 \times 10^{5}$ to $9.0 \times 10^{6}$ | Good | 440,000 |

Abbreviations of monomers and polymerization initiators in Table 1 indicate as follows.
PVAc: vinyl acetate
2EHA: 2-ethylhexyl acrylate
2EHMA: 2-ethylhexyl methacrylate
HEMA: 2-hydroxyethyl methacrylate
HEA: 2-hydroxyethyl acrylate
MAA: methacrylic acid
AA: acrylic acid
iso-BMA: iso-butyl methacrylate
n-BA: n-butyl acrylate
MMA: methyl methacrylate
AM: methyl acrylate
1,6HDDMA: 1,6-hexanediol dimethacrylate
EGDMA: ethylene glycol dimethacrylate
AK-5: dimethylsiloxane available from Toagosei Co., Ltd.
TFMA: 2,2,2-trifluoroethyl methacrylate
ACN: acrylonitrile Production Example 1: Production of Polymer for Coating Active Material (A1)

A four-necked flask equipped with a stirrer, a thermometer, a reflux condenser, a dripping funnel, and a nitrogen gas inlet tube was charged with DMF (14.3 parts) and methanol (2.9 parts), and the temperature was raised to 68° C. Subsequently, a monomer mixture containing methacrylic acid (41.7 parts), methyl methacrylate (16.6 parts), 2-ethylhexyl methacrylate (41.7 parts), DMF (9.0 parts), and methanol (1.8 parts), and an initiator solution containing 2,2'-azobis(2,4-dimethylvaleronitrile) (0.045 parts) dissolved in DMF (5.9 parts) were continuously dropped through the dripping funnel over 4 hours under stirring while nitrogen was blown into the four-necked flask to carry out radical polymerization. After completion of dropping, an initiator solution containing 2,2'-azobis(2,4-dimethylvaleronitrile) (0.100 parts) dissolved in DMF (4.5 parts) was continuously added over 2 hours through the dripping funnel. The polymerization was further continued at the boiling point for 4 hours. The solvent was removed and a resin (99.8 parts) was obtained. Then, isopropanol (232.9 parts) was added, whereby a solution of a polymer (A1) having a resin concentration of 30 wt % was obtained. The polymer (A1) had a molecular weight Mw of 210,000 as measured by GPC.

Production Example 2: Production of Polymer for Coating Active Material (A2)

A four-necked flask equipped with a stirrer, a thermometer, a reflux condenser, a dripping funnel, and a nitrogen gas inlet tube was charged with DMF (2.5 parts) and methanol (0.5 parts), and the temperature was raised to 68° C. Subsequently, a monomer mixture containing methacrylic acid (5.2 parts), n-butyl methacrylate (5.2 parts), 2-ethylhexyl methacrylate (59.9 parts), acrylate having a C24 branched alkyl group (2-decyltetradecyl methacrylate) (29.7 parts), DMF (9.2 parts), and methanol (1.9 parts), and an initiator solution containing 2,2'-azobis(2,4-dimethylvaleronitrile) (0.047 parts) dissolved in DMF (6.1 parts) were continuously dropped through the dripping funnel over 4 hours under stirring while nitrogen was blown into the four-necked flask to carry out radical polymerization. After completion of dropping, an initiator solution containing 2,2'-azobis(2,4-dimethylvaleronitrile) (0.103 parts) dissolved in DMF (4.6 parts) was continuously added over 2 hours through the dripping funnel. The polymerization was further continued at the boiling point for 4 hours. The solvent was removed and a resin (99.7 parts) was obtained. Then, isopropanol (232.6 parts) was added, whereby a solution of a polymer (A2) having a resin concentration of 30 wt % was obtained. The polymer (A2) had a molecular weight Mw of 230,000 as measured by GPC.

Production Example 3: Production of Polymer for Coating Active Material (A3)

A four-necked flask equipped with a stirrer, a thermometer, a reflux condenser, a dripping funnel, and a nitrogen gas inlet tube was charged with DMF (49.5 parts), and the temperature was raised to 75° C. Subsequently, a monomer mixture containing methacrylic acid (41.7 parts), methyl methacrylate (16.6 parts), 2-ethylhexyl methacrylate (41.7 parts), and DMF (45.1 parts), and an initiator solution containing 2,2'-azobis(2,4-dimethylvaleronitrile) (0.099 parts) and 2,2'-azobis(2-methylbutyronitrile) (0.300 parts) dissolved in DMF (4.5 parts) were continuously dropped through the dripping funnel over 1.5 hours under stirring while nitrogen was blown into the four-necked flask to carry out radical polymerization. After completion of dropping, the temperature was raised to 80° C., and the reaction was continued for 5 hours. Subsequently, an initiator solution containing 2,2'-azobis(2-methylbutyronitrile) (0.030 parts) dissolved in DMF (4.5 parts) was added, and the reaction was continued for additional 3 hours, followed by addition of DMF (129.7 parts), whereby a solution of a polymer (A3) having a resin concentration of 30 wt % was obtained. The polymer (A3) had a molecular weight Mw of 140,000 as measured by GPC.

Production Example 4: Production of Polymer for Coating Active Material (A4)

A four-necked flask equipped with a stirrer, a thermometer, a reflux condenser, a dripping funnel, and a nitrogen gas inlet tube was charged with DMF (46.1 parts), and the temperature was raised to 75° C. Subsequently, a monomer mixture containing methacrylic acid (41.4 parts), methyl methacrylate (16.5 parts), 2-ethylhexyl methacrylate (41.4 parts), lithium styrene sulfonate (0.5 parts), and DMF (44.0 parts), and an initiator solution containing 2,2'-azobis(2,4-dimethylvaleronitrile) (0.100 parts) and 2,2'-azobis(2-methylbutyronitrile) (0.300 parts) dissolved in DMF (5.6 parts) were continuously dropped through the dripping funnel over 1.5 hours under stirring while nitrogen was blown into the four-necked flask to carry out radical polymerization. After completion of dropping, the temperature was raised to 80° C., and the reaction was continued for 5 hours. Subsequently, an initiator solution containing 2,2'-azobis(2-methylbutyronitrile) (0.033 parts) dissolved in DMF (5.6 parts) was added, and the temperature was raised to 85° C. to continue the reaction for additional 3 hours, followed by addition of DMF (143.0 parts), whereby a solution of a polymer (A4) having a resin concentration of 30 wt % was obtained. The polymer (A4) had a molecular weight Mw of 60,000 as measured by GPC.

Production Example 5: Production of Polymer for Coating Active Material (A5)

A four-necked flask equipped with a stirrer, a thermometer, a reflux condenser, a dripping funnel, and a nitrogen gas inlet tube was charged with DMF (45.0 parts), and the temperature was raised to 75° C. Subsequently, a monomer mixture containing methacrylic acid (80 parts), methyl methacrylate (20 parts), and DMF (39.6 parts), and an initiator solution containing 2,2'-azobis(2,4-dimethylvaleronitrile) (0.09 parts) and 2,2'-azobis(2-methylbutyronitrile) (0.15 parts) dissolved in DMF (5.0 parts) were continuously dropped through the dripping funnel over 1.5 hours under stirring while nitrogen was blown into the four-necked flask to carry out radical polymerization. After completion of dropping, the temperature was raised to 80° C., and the reaction was continued for 5 hours. Subsequently, an initiator solution containing 2,2'-azobis(2-methylbutyronitrile) (0.03 parts) dissolved in DMF (5.0 parts) was added, and the temperature was raised to 85° C. to continue the reaction for additional 3 hours, followed by addition of DMF (115.0 parts), whereby a solution of a polymer (A5) having a resin concentration of 30 wt % was obtained. The polymer (A5) had a molecular weight Mw of 360,000 as measured by GPC.

Production Example 6: Preparation of Electrolyte Solution $LiPF_6$ was dissolved at a ratio of 1 mol/L in a solvent mixture of ethylene carbonate (EC) and diethyl carbonate (DEC) (volume ratio: EC:DEC=3:7). Thus, an electrolyte solution for a lithium-ion battery was produced.

Production Examples 7 to 23: Production of Negative Electrode Active Material for Lithium-Ion Battery Negative electrode active materials a lithium-ion battery in which the viscous adhesives (B1) to (B17) obtained respectively in Examples 1 to 17 were used as the resin solutions were produced by the following method.

Graphite powder (Nippon Graphite Industries, Co., Ltd., 90 parts) and acetylene black as a conductive additive (Denka Company Limited, Denka Black (trademark), 3.0 parts) were mixed in a planetary agitation type mixer/kneader (Thinkymixer (Thinky Corporation)) at 2000 rpm for 3 minutes.

Further, the resin solution (viscous adhesive) (40 parts; resin solids concentration: 10 wt %) was added, and mixed together at 2000 rpm for 3 minutes. Subsequently, the pressure was reduced to 0.01 MPa, and the temperature was raised to 100° C. The reduced pressure and the temperature were maintained for 8 hours, whereby the volatile matter was distilled off. The resulting powder was classified by a sieve having an opening of 212 μm, whereby negative electrode active materials for a lithium-ion battery (N'1) to (N'17) were obtained.

Production Examples 24 to 40: Production of Positive Electrode Active Material for Lithium-Ion Battery Positive electrode active materials for a lithium-ion battery in which the solutions of the viscous adhesives (B1) to (B17) obtained respectively in Production Examples 1 to 17 were used as the resin solutions were produced by the following method.

TABLE 2

| | Polymer | 2EHMA | MAA | n-BMA | MMA | DTM | LISS | Mw |
|---|---|---|---|---|---|---|---|---|
| Production Example 1 | Polymer for coating active material A1 | 41.7 | 41.7 | | 16.6 | | | 210000 |
| Production Example 2 | Polymer for coating active material A2 | 59.9 | 5.2 | 5.2 | | 29.7 | | 230000 |
| Production Example 3 | Polymer for coating active material A3 | 41.7 | 41.7 | | 16.6 | | | 140000 |
| Production Example 4 | Polymer for coating active material A4 | 41.4 | 41.4 | | 16.5 | | 0.5 | 60000 |
| Production Example 5 | Polymer for coating active material A5 | | 80.0 | | 20.0 | | | 360000 |

Abbreviations of monomers and polymerization initiators in Table 2 indicate as follows.

2EHMA: 2-ethylhexyl methacrylate
MAA: methacrylic acid
n-BMA: n-butyl methacrylate
MMA: methyl methacrylate
DTM: 2-decyltetradecyl methacrylate
LiSS: lithium styrene sulfonate $LiCoO_2$ powder (90 parts) and acetylene black as a conductive additive (Denka Company Limited, 5.0 parts) were mixed in a planetary agitation type mixer/kneader (Thinkymixer (Thinky Corporation)) at 2000 rpm for 3 minutes.

Further, the resin solution (viscous adhesive) (40 parts; resin solids concentration: 10 wt %) was added, and mixed together at 2000 rpm for 3 minutes. Subsequently, the pressure was reduced to 0.01 MPa, and the temperature was raised to 100° C. The reduced pressure and the temperature were maintained for 8 hours, whereby the volatile matter was distilled off. The resulting powder was classified by a sieve having an opening of 212 μm, whereby positive electrode active materials for a lithium-ion battery (P'1) to (P'17) were obtained.

Table 3 tabulates the negative electrode active materials for a lithium-ion battery and the positive electrode active materials for a lithium-ion battery of Production Examples 7 to 40.

TABLE 3

|  | Viscous adhesive | Negative electrode active material | Positive electrode active material |
|---|---|---|---|
| Production Example 7 | (B1) | (N'1) | — |
| Production Example 8 | (B2) | (N'2) | — |
| Production Example 9 | (B3) | (N'3) | — |
| Production Example 10 | (B4) | (N'4) | — |
| Production Example 11 | (B5) | (N'5) | — |
| Production Example 12 | (B6) | (N'6) | — |
| Production Example 13 | (B7) | (N'7) | — |
| Production Example 14 | (B8) | (N'8) | — |
| Production Example 15 | (B9) | (N'9) | — |
| Production Example 16 | (B10) | (N'10) | — |
| Production Example 17 | (B11) | (N'11) | — |
| Production Example 18 | (B12) | (N'12) | — |
| Production Example 19 | (B13) | (N'13) | — |
| Production Example 20 | (B14) | (N'14) | — |
| Production Example 21 | (B15) | (N'15) | — |
| Production Example 22 | (B16) | (N'16) | — |
| Production Example 23 | (B17) | (N'17) | — |
| Production Example 24 | (B1) | — | (P'1) |
| Production Example 25 | (B2) | — | (P'2) |
| Production Example 26 | (B3) | — | (P'3) |
| Production Example 27 | (B4) | — | (P'4) |
| Production Example 28 | (B5) | — | (P'5) |
| Production Example 29 | (B6) | — | (P'6) |
| Production Example 30 | (B7) | — | (P'7) |
| Production Example 31 | (B8) | — | (P'8) |
| Production Example 32 | (B9) | — | (P'9) |
| Production Example 33 | (B10) | — | (P'10) |
| Production Example 34 | (B11) | — | (P'11) |
| Production Example 35 | (B12) | — | (P'12) |
| Production Example 36 | (B13) | — | (P'13) |
| Production Example 37 | (B14) | — | (P'14) |
| Production Example 38 | (B15) | — | (P'15) |
| Production Example 39 | (B16) | — | (P'16) |
| Production Example 40 | (B17) | — | (P'17) |

[Production of coated negative electrode active material]

Production Examples 41 to 45

Coated negative electrode active materials for a lithium-ion battery in which the solutions of the polymers for coating active material (A1) to (A5) obtained respectively in Production Examples 1 to 5 were used as the resin solutions were produced by the following method.

Graphite powder (Nippon Graphite Industries, Co., Ltd., 1578 g) was placed in a universal mixer. While the powder was stirred at 150 rpm at room temperature, the resin solution (resin solids concentration: 30 wt %; 292 g) was dropped and mixed over 60 minutes, followed by stirring for additional 30 minutes.

Subsequently, while stirring, acetylene black (Denka Company Limited, 88 g) was added in three portions. While stirring for 30 minutes, the temperature was raised to 70° C., and the pressure was reduced to 0.01 MPa. This state was maintained for 30 minutes. Coated negative electrode active materials (A'1) to (A'5) (1752 g, each) were obtained by the above procedure.

[Production of coated positive electrode active material]

Production Example 46

A coated positive electrode active material for a lithium-ion battery in which the solution of the polymer for coating active material (A1) obtained in Production Example 1 was used as the resin solution was produced by the following method.

LiCoO$_2$ powder (1578 g) was placed in a universal mixer. While the powder was stirred at 150 rpm at room temperature, the resin solution (resin solids concentration: 30 wt %; 75 g) was dropped and mixed over 60 minutes, followed by stirring for additional 30 minutes.

Subsequently, while stirring, acetylene black (Denka Company Limited, 44 g) was added in three portions. While stirring for 30 minutes, the temperature was raised to 70° C., and the pressure was reduced to 0.01 MPa. This state was maintained for 30 minutes. A coated positive electrode active material (A"1) (1642 g) was obtained by the above procedure.

[Production of negative electrode for lithium-ion battery]

Examples 18 to 34

The negative electrode active materials for a lithium-ion battery (N'1) to (N'17) obtained in Production Examples 7 to 23 were molded to have a diameter of 17 mmϕ by a tablet press, whereby negative electrodes for a lithium-ion battery (N1) to (N17) of Examples 18 to 34 were obtained.

Table 4 tabulates the structures of the electrodes of Examples 18 to 34.

[Production of negative electrode for lithium-ion battery having coating layer]

Examples 35 to 39

Negative electrodes for a lithium-ion battery in which the coated negative electrode active materials (A'1) to (A'5) obtained respectively in Production Examples 41 to 45 were used were produced by the following method.

The coated negative electrode active material (198 g) was placed in a universal mixer. While the coated negative electrode active material was stirred at 150 rpm at room temperature, the solution of the viscous adhesive (B1) (resin solids concentration 10 wt %; 20 g) obtained in Example 1 was dropped and mixed, followed by stirring for 30 minutes.

Subsequently, while stirring, the temperature was raised to 70° C., and the pressure was reduced to 0.01 MPa. This state was maintained for 30 minutes. Mixtures (Ml) to (M5) (196 g, each) of the coated negative electrode active material and the viscous adhesive (B1) were obtained by the above procedure.

The mixture (99 parts) and acetylene black (1 part) were placed in a universal mixer, and stirred for 15 minutes. The resulting powder was molded to have a diameter of 17 mmϕ by a tablet press, whereby negative electrodes for a lithium-ion battery (N18) to (N22) of Examples 35 to 39 were obtained.

Examples 40 to 119

Negative electrodes for a lithium-ion battery (N23) to (N102) were produced as in Examples 35 to 39, using the viscous adhesives (B2) to (B17) of Examples 2 to 17 and the coated negative electrode active materials (A'1) to (A'5).

Tables 5 to 8 tabulate the structures of the electrodes of Examples 35 to 119.

Examples 120 to 136

Negative electrodes for a lithium-ion battery in which the mixtures obtained by mixing the coated negative electrode active material (A'1) used in Examples 35, 40, 45, 50, 55, 60, 65, 70, 75, 80, 85, 90, 95, 100, 105, 110, and 115 with the viscous adhesives (B1) to (B17), respectively, were used were produced by the following method.

The mixture (99 parts) and acetylene black (1 part) were placed in a universal mixer, and stirred for 15 minutes. The electrolyte solution (11.1 parts) produced in Production Example 6 was dropped thereto and stirred for 30 minutes. The resulting electrolyte solution-containing mixture (electrolyte solution slurry) was molded to have a diameter of 17 mmφ by a tablet press, whereby negative electrodes for a lithium-ion battery (N103) to (N119) of Examples 120 to 136 were obtained.

Table 9 tabulates the structures of the electrodes of Examples 120 to 136.

Examples 137 to 139

Negative electrodes for a lithium-ion battery (N120) to (N122) were produced as in Example 35, except that the thickness of each electrode active material layer of the negative electrode for a lithium-ion battery was changed.

Table 10 tabulates the structures of the electrodes of Examples 137 to 139.

Comparative Example 7

Graphite powder (Nippon Graphite Industries, Co., Ltd., 1578 g) was placed in a universal mixer. While the powder was stirred at 150 rpm at room temperature, acetylene black (Denka Company Limited, 88 g) was added in three portions, followed by stirring for 30 minutes. The resulting powder was molded to have a diameter of 17 mmφ by a tablet press, whereby a negative electrode for a lithium-ion battery (CN1) was produced.

Comparative Examples 8 to 12

Negative electrodes for a lithium-ion battery in which the coated negative electrode active materials (A'1) to (A'5) obtained respectively in Production Examples 41 to 45 were used were produced by the following method.

The coated negative electrode active material (99 parts) and acetylene black (1 part) were placed in a universal mixer, and stirred for 15 minutes. The resulting mixture was molded to have a diameter of 17 mmφ by a tablet press, whereby negative electrodes for a lithium-ion battery (CN2) to (CN6) of Comparative Examples 8 to 12 were produced.

Comparative Examples 13 to 18

Negative electrodes for a lithium-ion battery in which the viscous adhesives (B18) to (B23) obtained respectively in Comparative Examples 1 to 6 were used were produced by the following method.

Graphite powder (Nippon Graphite Industries, Co., Ltd., 90 parts) and acetylene black as a conductive additive (Denka Company Limited, Denka Black (trademark), 3.0 parts) were mixed in a planetary agitation type mixer/kneader (Thinkymixer (Thinky Corporation)) at 2000 rpm for 3 minutes.

Further, the solutions of the viscous adhesives (B18) to (B23) (40 parts, each) obtained respectively in Comparative Examples 1 to 6 were individually added and mixed at 2000 rpm for 3 minutes. Subsequently, the pressure was reduced to 0.01 MPa, and the temperature was raised to 100° C. The reduced pressure and the temperature were maintained for 8 hours, whereby the volatile matter was distilled off. The resulting powder was classified by a sieve having an opening of 212 μm, whereby negative electrode active materials for a lithium-ion battery (N'18) to (N'23) were obtained.

The resulting powder was molded to have a diameter of 17 mmφ by a tablet press, whereby negative electrodes for a lithium-ion battery (CN7) to (CN12) were produced.

Table 11 tabulates the structures of the electrodes of Comparative Examples 7 to 18.

<Measurement of thickness of electrode active material layer>

The thickness of the negative electrode active material layer of each of the negative electrodes for a lithium-ion battery produced in Examples 18 to 139 and Comparative Examples 7 to 18 was measured by a laser microscope.

<Shape evaluation test (stability in electrolyte solution)>

Each of the negative electrodes for a lithium-ion battery produced in Examples 18 to 139 and Comparative Examples 7 to 18 was immersed in the electrolyte solution (the electrolyte solution produced in Production Example 6) in a sealed case under a reduced pressure to visually observe whether or not the shape of the electrode was maintained in the electrolyte solution. When the shape was not destroyed by immersion for 72 hours, it was determined as "not destroyed".

When the shape of the electrode is maintained after injection of the electrolyte solution, the internal resistance does not increase, so that the electrode can have excellent cycle characteristics.

[Production of lithium-ion battery for evaluation of negative electrode]

A 17-mmφ positive electrode made of Li metal and one of the negative electrodes produced in Examples 18 to 139 and Comparative Examples 7 to 18 were placed in a 2032 type coin cell therebetween, and two separators (Celgard 2500 made of polypropylene) were inserted between the electrodes, whereby a lithium-ion battery cell was produced. An electrolyte solution was injected into the cell and the cell was sealed. Then, the internal resistance, initial discharge capacity, and discharge capacity at the end of 20 cycles were evaluated by the following methods.

[Evaluation of internal resistance during initial cycles]

A graph of [Voltage drop (ΔV)–Current (I)] was created from the [difference (ΔV) between "Voltage at the start of discharging" and "Voltage at 10 seconds after the start of discharging" ] at each of 1st to 4th cycles and a current value (I) at each cycle. The method of least squares was used to calculate the resistance value R that satisfies ΔV=RI, which was regarded as the internal resistance during initial cycles.

<Evaluation of discharge capacity of lithium-ion battery>

Using a charge/discharge measurement device "Battery Analyzer model 1470" (TOYO Corporation) at room temperature, the battery was charged to a voltage of 2.5 V at a current of 0.2 C, followed by a 10-minute pause, and was then discharged to a voltage of 10 mV at a current of 0.2 C. This charge/discharge cycle was repeated 20 times. The battery capacity at the initial discharging (initial discharge capacity) and the battery capacity at the time of discharging in the 20th cycle (discharge capacity at the end of 20 cycles) were measured.

Tables 4 to 11 tabulate the measured thicknesses of the electrode active material layers, results of the shape evaluation test (stability in the electrolyte solution), and evaluation of internal resistance and discharge capacities of the lithium-ion batteries.

TABLE 4

| | Negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|
| Example 18 | (N'1) | (B1) | (N1) | 424 | Not destroyed | 12.0 | 351 | 351 |
| Example 19 | (N'2) | (B2) | (N2) | 413 | Not destroyed | 12.1 | 352 | 351 |
| Example 20 | (N'3) | (B3) | (N3) | 422 | Not destroyed | 12.4 | 355 | 354 |
| Example 21 | (N'4) | (B4) | (N4) | 425 | Not destroyed | 11.9 | 351 | 350 |
| Example 22 | (N'5) | (B5) | (N5) | 415 | Not destroyed | 12.2 | 352 | 352 |
| Example 23 | (N'6) | (B6) | (N6) | 420 | Not destroyed | 12.8 | 348 | 347 |
| Example 24 | (N'7) | (B7) | (N7) | 415 | Not destroyed | 12.8 | 350 | 349 |
| Example 25 | (N'8) | (B8) | (N8) | 418 | Not destroyed | 12.4 | 355 | 354 |
| Example 26 | (N'9) | (B9) | (N9) | 422 | Not destroyed | 12.1 | 354 | 354 |
| Example 27 | (N'10) | (B10) | (N10) | 414 | Not destroyed | 11.6 | 351 | 351 |
| Example 28 | (N'11) | (B11) | (N11) | 420 | Not destroyed | 12.7 | 352 | 351 |
| Example 29 | (N'12) | (B12) | (N12) | 417 | Not destroyed | 12.4 | 348 | 347 |
| Example 30 | (N'13) | (B13) | (N13) | 415 | Not destroyed | 13.0 | 347 | 346 |
| Example 31 | (N'14) | (B14) | (N14) | 413 | Not destroyed | 12.8 | 344 | 339 |
| Example 32 | (N'15) | (B15) | (N15) | 422 | Not destroyed | 13.4 | 351 | 347 |
| Example 33 | (N'16) | (B16) | (N16) | 420 | Not destroyed | 11.8 | 349 | 346 |
| Example 34 | (N'17) | (B17) | (N17) | 419 | Not destroyed | 12.2 | 348 | 342 |

TABLE 5

| | Polymer for coating active material | Coated negative electrode active material | Viscous adhesive | Negative electrode for lithoum-ion battery | Thickness of electrode active material layer (μm) | Stability in electrolyte solution | Internal resistance (Ω) | Initial discharge capacity (mAh/g) | Discharge capacity at the end of 20 cylces (mAh/g) |
|---|---|---|---|---|---|---|---|---|---|
| Example 35 | (A1) | (A'1) | (B1) | (N18) | 431 | Not destroyed | 12.8 | 353 | 353 |
| Example 36 | (A2) | (A'2) | (B1) | (N19) | 420 | Not destroyed | 12.5 | 357 | 357 |
| Example 37 | (A3) | (A'3) | (B1) | (N20) | 409 | Not destroyed | 13.1 | 354 | 354 |
| Example 38 | (A4) | (A'4) | (B1) | (N21) | 402 | Not destroyed | 12.8 | 354 | 354 |
| Example 39 | (A5) | (A'5) | (B1) | (N22) | 408 | Not destroyed | 12.7 | 353 | 357 |
| Example 40 | (A1) | (A'1) | (B2) | (N23) | 414 | Not destroyed | 12.9 | 351 | 351 |
| Example 41 | (A2) | (A'2) | (B2) | (N24) | 410 | Not destroyed | 12.6 | 353 | 352 |
| Example 42 | (A3) | (A'3) | (B2) | (N25) | 432 | Not destroyed | 13.1 | 353 | 352 |
| Example 43 | (A4) | (A'4) | (B2) | (N26) | 421 | Not destroyed | 12.8 | 355 | 355 |
| Example 44 | (A5) | (A'5) | (B2) | (N27) | 411 | Not destroyed | 12.7 | 353 | 353 |
| Example 45 | (A1) | (A'1) | (B3) | (N28) | 408 | Not destroyed | 13.1 | 357 | 358 |
| Example 46 | (A2) | (A'2) | (B3) | (N29) | 401 | Not destroyed | 13.3 | 352 | 352 |
| Example 47 | (A3) | (A'3) | (B3) | (N30) | 398 | Not destroyed | 13.1 | 358 | 357 |
| Example 48 | (A4) | (A'4) | (B3) | (N31) | 424 | Not destroyed | 13.5 | 351 | 351 |
| Example 49 | (A5) | (A'5) | (B3) | (N32) | 415 | Not destroyed | 13.2 | 356 | 356 |
| Example 50 | (A1) | (A'1) | (B4) | (N33) | 404 | Not destroyed | 13.5 | 352 | 352 |
| Example 51 | (A2) | (A'2) | (B4) | (N34) | 423 | Not destroyed | 13.4 | 355 | 355 |
| Example 52 | (A3) | (A'3) | (B4) | (N35) | 421 | Not destroyed | 13.2 | 357 | 356 |
| Example 53 | (A4) | (A'4) | (B4) | (N36) | 418 | Not destroyed | 12.9 | 351 | 351 |
| Example 54 | (A5) | (A'5) | (B4) | (N37) | 430 | Not destroyed | 13.7 | 357 | 356 |
| Example 55 | (A1) | (A'1) | (B5) | (N38) | 410 | Not destroyed | 12.9 | 354 | 354 |
| Example 56 | (A2) | (A'2) | (B5) | (N39) | 403 | Not destroyed | 13.2 | 358 | 358 |
| Example 57 | (A3) | (A'3) | (B5) | (N40) | 432 | Not destroyed | 13.6 | 352 | 352 |
| Example 58 | (A4) | (A'4) | (B5) | (N41) | 438 | Not destroyed | 13.8 | 356 | 356 |
| Example 59 | (A5) | (A'5) | (B5) | (N42) | 423 | Not destroyed | 13.7 | 351 | 351 |

TABLE 6

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 60 | (A1) | (A'1) | (B6) | (N43) | 413 | Not destroyed | 13.2 | 358 | 357 |
| Example 61 | (A2) | (A'2) | (B6) | (N44) | 401 | Not destroyed | 12.8 | 356 | 356 |
| Example 62 | (A3) | (A'3) | (B6) | (N45) | 409 | Not destroyed | 13.6 | 352 | 351 |
| Example 63 | (A4) | (A'4) | (B6) | (N46) | 431 | Not destroyed | 12.9 | 357 | 356 |
| Example 64 | (A5) | (A'5) | (B6) | (N47) | 425 | Not destroyed | 13.2 | 353 | 353 |
| Example 65 | (A1) | (A'1) | (B7) | (N48) | 421 | Not destroyed | 12.6 | 354 | 354 |

TABLE 6-continued

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 66 | (A2) | (A'2) | (B7) | (N49) | 413 | Not destroyed | 13.1 | 358 | 358 |
| Example 67 | (A3) | (A'3) | (B7) | (N50) | 417 | Not destroyed | 13.5 | 356 | 356 |
| Example 68 | (A4) | (A'4) | (B7) | (N51) | 495 | Not destroyed | 13.2 | 352 | 352 |
| Example 69 | (A5) | (A'5) | (B7) | (N52) | 408 | Not destroyed | 12.8 | 357 | 357 |
| Example 70 | (A1) | (A'1) | (B8) | (N53) | 412 | Not destroyed | 13.1 | 351 | 351 |
| Example 71 | (A2) | (A'2) | (B8) | (N54) | 422 | Not destroyed | 13.3 | 356 | 356 |
| Example 72 | (A3) | (A'3) | (B8) | (N55) | 420 | Not destroyed | 13.2 | 353 | 353 |
| Example 73 | (A4) | (A'4) | (B8) | (N56) | 423 | Not destroyed | 12.7 | 354 | 354 |
| Example 74 | (A5) | (A'5) | (B8) | (N57) | 403 | Not destroyed | 13.0 | 355 | 355 |
| Example 75 | (A1) | (A'1) | (B9) | (N58) | 405 | Not destroyed | 13.5 | 352 | 352 |
| Example 76 | (A2) | (A'2) | (B9) | (N59) | 417 | Not destroyed | 13.2 | 356 | 356 |
| Example 77 | (A3) | (A'3) | (B9) | (N60) | 407 | Not destroyed | 12.6 | 353 | 353 |
| Example 78 | (A4) | (A'4) | (B9) | (N61) | 428 | Not destroyed | 13.1 | 357 | 357 |
| Example 79 | (A5) | (A'5) | (B9) | (N62) | 419 | Not destroyed | 12.8 | 352 | 352 |
| Example 80 | (A1) | (A'1) | (B10) | (N63) | 401 | Not destroyed | 13.2 | 356 | 356 |
| Example 81 | (A2) | (A'2) | (B10) | (N64) | 421 | Not destroyed | 13.5 | 351 | 351 |
| Example 82 | (A3) | (A'3) | (B10) | (N65) | 411 | Not destroyed | 12.9 | 358 | 358 |
| Example 83 | (A4) | (A'4) | (B10) | (N66) | 414 | Not destroyed | 13.1 | 350 | 350 |
| Example 84 | (A5) | (A'5) | (B10) | (N67) | 432 | Not destroyed | 13.2 | 353 | 353 |

TABLE 7

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 85 | (A1) | (A'1) | (B11) | (N68) | 413 | Not destroyed | 12.6 | 356 | 356 |
| Example 86 | (A2) | (A'2) | (B11) | (N69) | 392 | Not destroyed | 12.8 | 354 | 354 |
| Example 87 | (A3) | (A'3) | (B11) | (N70) | 441 | Not destroyed | 13.6 | 357 | 357 |
| Example 88 | (A4) | (A'4) | (B11) | (N71) | 425 | Not destroyed | 13.1 | 356 | 356 |
| Example 89 | (A5) | (A'5) | (B11) | (N72) | 433 | Not destroyed | 13.2 | 355 | 355 |
| Example 90 | (A1) | (A'1) | (B12) | (N73) | 433 | Not destroyed | 13.1 | 351 | 351 |
| Example 91 | (A2) | (A'2) | (B12) | (N74) | 421 | Not destroyed | 13.1 | 352 | 352 |
| Example 92 | (A3) | (A'3) | (B12) | (N75) | 427 | Not destroyed | 12.7 | 356 | 356 |
| Example 93 | (A4) | (A'4) | (B12) | (N76) | 429 | Not destroyed | 13.2 | 353 | 353 |
| Example 94 | (A5) | (A'5) | (B12) | (N77) | 421 | Not destroyed | 13.5 | 355 | 355 |
| Example 95 | (A1) | (A'1) | (B13) | (N78) | 436 | Not destroyed | 13.1 | 358 | 358 |
| Example 96 | (A2) | (A'2) | (B13) | (N79) | 412 | Not destroyed | 13.3 | 351 | 351 |
| Example 97 | (A3) | (A'3) | (B13) | (N80) | 431 | Not destroyed | 13.2 | 354 | 354 |
| Example 98 | (A4) | (A'4) | (B13) | (N81) | 428 | Not destroyed | 12.7 | 357 | 357 |
| Example 99 | (A5) | (A'5) | (B13) | (N82) | 437 | Not destroyed | 12.9 | 351 | 351 |
| Example 100 | (A1) | (A'1) | (B14) | (N83) | 432 | Not destroyed | 13.2 | 352 | 350 |
| Example 101 | (A2) | (A'2) | (B14) | (N84) | 431 | Not destroyed | 13.2 | 350 | 348 |
| Example 102 | (A3) | (A'3) | (B14) | (N85) | 426 | Not destroyed | 12.6 | 356 | 353 |
| Example 103 | (A4) | (A'4) | (B14) | (N86) | 421 | Not destroyed | 13.1 | 353 | 351 |
| Example 104 | (A5) | (A'5) | (B14) | (N87) | 435 | Not destroyed | 13.4 | 351 | 350 |
| Example 105 | (A1) | (A'1) | (B15) | (N88) | 432 | Not destroyed | 13.1 | 352 | 350 |
| Example 106 | (A2) | (A'2) | (B15) | (N89) | 413 | Not destroyed | 13.5 | 351 | 349 |
| Example 107 | (A3) | (A'3) | (B15) | (N90) | 421 | Not destroyed | 12.9 | 353 | 351 |
| Example 108 | (A4) | (A'4) | (B15) | (N91) | 427 | Not destroyed | 13.1 | 352 | 350 |
| Example 109 | (A5) | (A'5) | (B15) | (N92) | 421 | Not destroyed | 13.5 | 351 | 349 |

TABLE 8

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 110 | (A1) | (A'1) | (B16) | (N93) | 413 | Not destroyed | 12.9 | 356 | 356 |
| Example 111 | (A2) | (A'2) | (B16) | (N94) | 392 | Not destroyed | 13.1 | 354 | 354 |
| Example 112 | (A3) | (A'3) | (B16) | (N95) | 441 | Not destroyed | 12.7 | 357 | 357 |
| Example 113 | (A4) | (A'4) | (B16) | (N96) | 425 | Not destroyed | 13.1 | 356 | 356 |

TABLE 8-continued

| | Polymer for coating active material | Coated negative electrode active material | Viscous adhesive | Negative electrode for lithium-ion battery | Thickness of electrode active material layer (μm) | Stability in electrode solution | Internal resistance (Ω) | Initial discharge capacity (mAh/g) | Discharge capacity at the end of 20 cycles (mAh/g) |
|---|---|---|---|---|---|---|---|---|---|
| Example 114 | (A5) | (A'5) | (B16) | (N97) | 423 | Not destroyed | 12.8 | 355 | 355 |
| Example 115 | (A1) | (A'1) | (B17) | (N98) | 433 | Not destroyed | 13.2 | 351 | 351 |
| Example 116 | (A2) | (A'2) | (B17) | (N99) | 421 | Not destroyed | 12.7 | 352 | 352 |
| Example 117 | (A3) | (A'3) | (B17) | (N100) | 427 | Not destroyed | 13.1 | 356 | 356 |
| Example 118 | (A4) | (A'4) | (B17) | (N101) | 429 | Not destroyed | 12.9 | 353 | 353 |
| Example 119 | (A5) | (A'5) | (B17) | (N102) | 421 | Not destroyed | 13.2 | 355 | 355 |

TABLE 9

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 120 | (A1) | (A'1) | (B1) | (N103) | 419 | Not destroyed | 12.6 | 356 | 356 |
| Example 121 | (A1) | (A'1) | (B2) | (N104) | 416 | Not destroyed | 13.2 | 349 | 349 |
| Example 122 | (A1) | (A'1) | (B3) | (N105) | 438 | Not destroyed | 13.7 | 353 | 353 |
| Example 123 | (A1) | (A'1) | (B4) | (N106) | 432 | Not destroyed | 12.9 | 351 | 351 |
| Example 124 | (A1) | (A'1) | (B5) | (N107) | 431 | Not destroyed | 13.2 | 348 | 348 |
| Example 125 | (A1) | (A'1) | (B6) | (N108) | 414 | Not destroyed | 12.2 | 350 | 350 |
| Example 126 | (A1) | (A'1) | (B7) | (N109) | 411 | Not destroyed | 13.5 | 345 | 345 |
| Example 127 | (A1) | (A'1) | (B8) | (N110) | 405 | Not destroyed | 13.1 | 347 | 347 |
| Example 128 | (A1) | (A'1) | (B9) | (N111) | 425 | Not destroyed | 12.7 | 353 | 353 |
| Example 129 | (A1) | (A'1) | (B10) | (N112) | 418 | Not destroyed | 12.6 | 352 | 352 |
| Example 130 | (A1) | (A'1) | (B11) | (N113) | 408 | Not destroyed | 13.2 | 348 | 348 |
| Example 131 | (A1) | (A'1) | (B12) | (N114) | 415 | Not destroyed | 13.4 | 346 | 346 |
| Example 132 | (A1) | (A'1) | (B13) | (N115) | 421 | Not destroyed | 13.0 | 351 | 351 |
| Example 133 | (A1) | (A'1) | (B14) | (N116) | 420 | Not destroyed | 13.2 | 349 | 347 |
| Example 134 | (A1) | (A'1) | (B15) | (N117) | 416 | Not destroyed | 13.5 | 346 | 344 |
| Example 135 | (A1) | (A'1) | (B16) | (N118) | 414 | Not destroyed | 12.8 | 352 | 350 |
| Example 136 | (A1) | (A'1) | (B17) | (N119) | 419 | Not destroyed | 12.7 | 351 | 348 |

TABLE 10

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 137 | (A1) | (A'1) | (B1) | (N120) | 47 | Not destroyed | 13.1 | 367 | 367 |
| Example 138 | (A1) | (A'1) | (B1) | (N121) | 109 | Not destroyed | 12.9 | 362 | 362 |
| Example 139 | (A1) | (A'1) | (B1) | (N122) | 2091 | Not destroyed | 12.8 | 251 | 250 |

TABLE 11

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Comparative Example 7 | — | — | — | (CN1) | 420 | Destroyed in 3 mins | 12.7 | 133 | 31 |
| Comparative Example 8 | (A1) | (A'1) | — | (CN2) | 403 | Destroyed in 6 mins | 13.2 | 209 | 91 |
| Comparative Example 9 | (A2) | (A'2) | — | (CN3) | 413 | Destroyed in 5 mins | 12.8 | 159 | 61 |
| Comparative Example 10 | (A3) | (A'3) | — | (CN4) | 427 | Destroyed in 4 mins | 14.1 | 191 | 82 |
| Comparative Example 11 | (A4) | (A'4) | — | (CN5) | 411 | Destroyed in 6 mins | 13.5 | 210 | 96 |

TABLE 11-continued

| | Polymer for coating active material | Coated negative electrode active material | Viscous adhesive | Negative electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Comparative Example 12 | (A5) | (A'5) | — | (CN6) | 407 | Destroyed in 8 mins | 13.6 | 198 | 102 |
| Comparative Example 13 | — | — | (B18) | (CN7) | 416 | Destroyed in 10 mins | 13.7 | 181 | 80 |
| Comparative Example 14 | — | — | (B19) | (CN8) | 410 | Not destroyed | 18.5 | 350 | 182 |
| Comparative Example 15 | — | — | (B20) | (CN9) | 408 | Destroyed in 2 mins | 12.8 | 221 | 109 |
| Comparative Example 16 | — | — | (B21) | (CN10) | 413 | Destroyed in 5 mins | 12.9 | 185 | 91 |
| Comparative Example 17 | — | — | (B22) | (CN11) | 408 | Destroyed in 8 mins | 13.1 | 179 | 61 |
| Comparative Example 18 | — | — | (B23) | (CN12) | 420 | Destroyed in 10 hrs | 13.5 | 281 | 122 |

Production of positive electrode for lithium-ion battery

Examples 140 to 156

The positive electrode active materials for a lithium-ion battery (P'1) to (P'17) obtained in Production Examples 24 to 40 were molded to have a diameter of 17 mmϕ by a tablet press, whereby positive electrodes for a lithium-ion battery (P123) to (P139) of Examples 140 to 156 were obtained.

Table 12 tabulates the structures of the electrodes of Examples 140 to 156.

[Production of positive electrode for lithium-ion battery having coating layer]

Example 157

The coated positive electrode active material (A"1) (198 g) obtained in Production Example 46 was placed in a universal mixer. While the coated negative electrode active material was stirred at 150 rpm at room temperature, the solution of the viscous adhesive (B1) (resin solids concentration 10 wt %; 20 g) obtained in Example 1 was dropped and mixed, followed by stirring for 30 minutes.

Subsequently, while stirring, the temperature was raised to 70° C., and the pressure was reduced to 0.01 MPa. This state was maintained for 30 minutes. A mixture (M140) (196 g) of the coated positive electrode active material and the viscous adhesive (B1) was obtained by the above procedure.

The mixture (95 parts) and acetylene black (5 parts) were placed in a universal mixer, and stirred for 15 minutes. The resulting powder was molded to have a diameter of 17 mmϕ by a tablet press, whereby a positive electrode for a lithium-ion battery (P140) of Example 157 was obtained.

Examples 158 to 173

Positive electrodes for a lithium-ion battery (P141) to (P156) were produced as in Example 157, using the viscous adhesives (B2) to (B17) of Examples 2 to 17 and the coated positive electrode active material (A"1).

Table 13 tabulates the structures of the electrodes of Examples 157 to 173.

Example 174

A positive electrode for a lithium-ion battery in which the mixture of the coated positive electrode active material (A"1) and the viscous adhesive (B1) used in Example 157 was used was produced by the following method.

The mixture (95 parts) and acetylene black (5 parts) were placed in a universal mixer, and stirred for 15 minutes. The electrolyte solution (11.1 parts) produced in Production Example 6 was dropped thereto and stirred for 30 minutes. The resulting electrolyte solution-containing mixture (electrolyte solution slurry) was molded to have a diameter of 17 mmϕ by a tablet press, whereby a positive electrode for a lithium-ion battery (P157) of Example 174 was obtained.

Examples 175 to 190

Positive electrodes for a lithium-ion battery (P158) to (P173) were produced as in Example 174, using electrolyte solution-containing mixtures (electrolyte solution slurry) containing the coated positive electrode active material (A"1) and respective viscous adhesives (B2) to (B17) of Examples 2 to 17.

Table 14 tabulates the structures of the electrodes of Examples 174 to 190.

Examples 191 to 193

Positive electrodes for a lithium-ion battery (P174) to (P176) were produced as in Example 157, except that the thickness of each electrode active material layer of the positive electrode for a lithium-ion battery was changed.

Table 15 tabulates the structures of the electrodes of Examples 191 to 193.

Comparative Example 19

LiCoO$_2$ powder (1578 g) was placed in a universal mixer. While the powder was stirred at 150 rpm at room temperature, acetylene black (Denka Company Limited, 129 g) was added in five portions, followed by stirring for 30 minutes.

The resulting powder was molded to have a diameter of 17 mmϕ by a tablet press, whereby a positive electrode for a lithium-ion battery (CP13) was produced.

Comparative Example 20

A positive electrode for a lithium-ion battery in which the coated positive electrode active material (A"1) obtained in Production Example 46 was used was produced by the following method.

The coated positive electrode active material (95 parts) and acetylene black (5 parts) were placed in a universal mixer, and stirred for 15 minutes. The resulting powder was molded to have a diameter of 17 mmφ by a tablet press, whereby a positive electrode for a lithium-ion battery (CP14) of Comparative Example 20 was obtained.

Comparative Examples 21 to 26

Positive electrodes for a lithium-ion battery in which the viscous adhesives (B18) to (B23) obtained respectively in Comparative Examples 1 to 6 were used were produced by the following method.

LiCoO$_2$ powder (90 parts) and acetylene black as a conductive additive (Denka Company Limited, 5.0 parts) were mixed in a planetary agitation type mixer/kneader (Thinkymixer (Thinky Corporation)) at 2000 rpm for 3 minutes.

Further, the solutions of the viscous adhesives (B18) to (B23) (40 parts, each) obtained respectively in Comparative Examples 1 to 6 were individually added and mixed at 2000 rpm for 3 minutes. Subsequently, the pressure was reduced to 0.01 MPa, and the temperature was raised to 100° C. The reduced pressure and the temperature were maintained for 8 hours, whereby the volatile matter was distilled off. The resulting powder was classified by a sieve having an opening of 212 μm, whereby positive electrode active materials for a lithium-ion battery (P'18) to (P'23) were obtained.

The resulting powder was molded to have a diameter of 17 mmφ by a tablet press, whereby positive electrodes for a lithium-ion battery (CP15) to (CP20) were produced.

Table 16 tabulates the structures of the electrodes of Comparative Examples 19 to 26.
<Measurement of thickness of electrode active material layer>

The thickness of the positive electrode active material layer of each of the positive electrodes for a lithium-ion battery produced in Examples 140 to 193 and Comparative Examples 19 to 26 was measured by a laser microscope.
<Shape evaluation test (stability in electrolyte solution)>

Each of the positive electrodes for a lithium-ion battery produced in Examples 140 to 193 and Comparative Examples 19 to 26 was immersed in the electrolyte solution (the electrolyte solution produced in Production Example 6) in a sealed case under a reduced pressure to visually observe whether or not the shape of the electrode was maintained in the electrolyte solution.

When the shape was not destroyed by immersion for 72 hours, it was determined as "not destroyed".

When the shape of the electrode is maintained after injection of the electrolyte solution, the internal resistance does not increase, so that the electrode can have excellent cycle characteristics.
[Production of lithium-ion battery for evaluation of positive electrode]

A 17-mmφ negative electrode made of Li metal and one of the positive electrodes produced in Examples 140 to 193 and Comparative Examples 19 to 26 were placed in a 2032 type coin cell therebetween, and two separators (Celgard 2500 made of polypropylene) were inserted between the electrodes, whereby a lithium-ion battery cell was produced. An electrolyte solution was injected into the cell and the cell was sealed. Then, the internal resistance, initial discharge capacity, and discharge capacity at the end of 20 cycles were evaluated by the following methods.
[Evaluation of internal resistance during initial cycles]

A graph of [Voltage drop (ΔV)–Current (I)] was created from the [difference (ΔV) between "Voltage at the start of discharging" and "Voltage at 10 seconds after the start of discharging"] at each of 1st to 4th cycles and a current value (I) at each cycle. The method of least squares was used to calculate the resistance value R that satisfies ΔV=RI, which was regarded as the internal resistance during initial cycles.
<Evaluation of discharge capacity of lithium-ion battery>

Using a charge/discharge measurement device "Battery Analyzer model 1470" (TOYO Corporation) at room temperature, the battery was charged to a voltage of 4.3 V at a current of 0.2 C, followed by a 10-minute pause, and was then discharged to a voltage of 2.7 V at a current of 0.2 C. This charge/discharge cycle was repeated 20 times. The battery capacity at the initial discharging (initial discharge capacity) and the battery capacity at the time of discharging in the 20th cycle (discharge capacity at the end of 20 cycles) were measured.

Tables 12 to 16 tabulate the measured thicknesses of the electrode active material layers, results of the shape evaluation test (stability in the electrolyte solution), and evaluation of internal resistance and discharge capacities of the lithium-ion batteries.

TABLE 12

| | Positive electrode active material | Viscous adhesive | Positive electrode for lithium-ion battery | Thickness of electrode active material layer (μm) | Stability in electrolyte solution | Internet resistance (Ω) | Initial discharge capacity (mAh/g) | Discharge capacity at the end of 20 cycles (mAh/g) |
|---|---|---|---|---|---|---|---|---|
| Example 140 | (P'1) | (B1) | (P123) | 422 | Not destroyed | 11.9 | 151 | 150 |
| Example 141 | (P'2) | (B2) | (P124) | 411 | Not destroyed | 12.0 | 155 | 154 |
| Example 142 | (P'3) | (B3) | (P125) | 424 | Not destroyed | 12.4 | 153 | 153 |
| Example 143 | (P'4) | (B4) | (P126) | 427 | Not destroyed | 11.8 | 151 | 151 |
| Example 144 | (P'5) | (B5) | (P127) | 417 | Not destroyed | 12.0 | 152 | 151 |
| Example 145 | (P'6) | (B6) | (P128) | 420 | Not destroyed | 12.6 | 154 | 153 |
| Example 146 | (P'7) | (B7) | (P129) | 416 | Not destroyed | 12.3 | 152 | 151 |
| Example 147 | (P'8) | (B8) | (P130) | 418 | Not destroyed | 12.1 | 153 | 152 |
| Example 148 | (P'9) | (B9) | (P131) | 418 | Not destroyed | 11.9 | 157 | 156 |
| Example 149 | (P'10) | (B10) | (P132) | 422 | Not destroyed | 11.8 | 154 | 153 |
| Example 150 | (P'11) | (B11) | (P133) | 420 | Not destroyed | 12.4 | 152 | 162 |
| Example 151 | (P'12) | (B12) | (P134) | 416 | Not destroyed | 12.1 | 149 | 149 |
| Example 152 | (P'13) | (B13) | (P135) | 412 | Not destroyed | 12.8 | 153 | 153 |
| Example 153 | (P'14) | (B14) | (P136) | 420 | Not destroyed | 12.5 | 155 | 153 |
| Example 154 | (P'15) | (B15) | (P137) | 416 | Not destroyed | 13.3 | 157 | 153 |

TABLE 12-continued

| | Positive electrode active material | Viscous adhesive | Positive electrode for lithium-ion battery | Thickness of electrode active material layer (μm) | Stability in electrolyte solution | Internet resistance (Ω) | Initial discharge capacity (mAh/g) | Discharge capacity at the end of 20 cycles (mAh/g) |
|---|---|---|---|---|---|---|---|---|
| Example 155 | (P'16) | (B16) | (P138) | 403 | Not destroyed | 12.7 | 160 | 148 |
| Example 156 | (P'17) | (B17) | (P139) | 414 | Not destroyed | 12.6 | 152 | 150 |

TABLE 13

| | Polymer for coating active material | Coated positive electrode active material | Viscous adhesive | Positive electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 157 | (A1) | (A"1) | (B1) | (P140) | 411 | Not destroyed | 12.7 | 153 | 152 |
| Example 158 | (A1) | (A"1) | (B2) | (P141) | 405 | Not destroyed | 12.3 | 152 | 151 |
| Example 159 | (A1) | (A"1) | (B3) | (P142) | 415 | Not destroyed | 12.5 | 153 | 153 |
| Example 160 | (A1) | (A"1) | (B4) | (P143) | 422 | Not destroyed | 13.0 | 154 | 154 |
| Example 161 | (A1) | (A"1) | (B5) | (P144) | 418 | Not destroyed | 12.8 | 152 | 151 |
| Example 162 | (A1) | (A"1) | (B6) | (P145) | 412 | Not destroyed | 12.3 | 158 | 158 |
| Example 163 | (A1) | (A"1) | (B7) | (P146) | 416 | Not destroyed | 12.2 | 155 | 154 |
| Example 164 | (A1) | (A"1) | (B8) | (P147) | 421 | Not destroyed | 12.6 | 149 | 149 |
| Example 165 | (A1) | (A"1) | (B9) | (P148) | 403 | Not destroyed | 12.8 | 154 | 154 |
| Example 166 | (A1) | (A"1) | (B10) | (P149) | 414 | Not destroyed | 12.4 | 155 | 155 |
| Example 167 | (A1) | (A"1) | (B11) | (P150) | 405 | Not destroyed | 12.9 | 151 | 151 |
| Example 168 | (A1) | (A"1) | (B12) | (P151) | 424 | Not destroyed | 12.6 | 149 | 149 |
| Example 169 | (A1) | (A"1) | (B13) | (P152) | 412 | Not destroyed | 11.9 | 147 | 147 |
| Example 170 | (A1) | (A"1) | (B14) | (P153) | 421 | Not destroyed | 12.3 | 152 | 151 |
| Example 171 | (A1) | (A"1) | (B15) | (P154) | 413 | Not destroyed | 12.5 | 150 | 150 |
| Example 172 | (A1) | (A"1) | (B16) | (P155) | 416 | Not destroyed | 12.2 | 151 | 151 |
| Example 173 | (A1) | (A"1) | (B17) | (P156) | 411 | Not destroyed | 12.8 | 150 | 149 |

TABLE 14

| | Polymer for coating active material | Coated positive electrode active material | Viscous adhesive | Positive electrode for lithium-ion battery | Thickness of electrode active material layer (μm) | Stability in electrolyte solution | Internal resistance (Ω) | Initial discharge capacity (mAh/g) | Discharge capacity at the end of 20 cycles (mAh/g) |
|---|---|---|---|---|---|---|---|---|---|
| Example 174 | (A1) | (A"1) | (B1) | (P157) | 402 | Not destroyed | 12.3 | 154 | 154 |
| Example 175 | (A1) | (A"1) | (B2) | (P158) | 410 | Not destroyed | 12.6 | 157 | 157 |
| Example 176 | (A1) | (A"1) | (B3) | (P159) | 406 | Not destroyed | 13.2 | 151 | 150 |
| Example 177 | (A1) | (A"1) | (B4) | (P160) | 419 | Not destroyed | 12.9 | 148 | 148 |
| Example 178 | (A1) | (A"1) | (B5) | (P161) | 413 | Not destroyed | 13.0 | 150 | 151 |
| Example 179 | (A1) | (A"1) | (B6) | (P162) | 409 | Not destroyed | 12.1 | 148 | 148 |
| Example 180 | (A1) | (A"1) | (B7) | (P163) | 415 | Not destroyed | 12.4 | 151 | 151 |
| Example 181 | (A1) | (A"1) | (B8) | (P164) | 411 | Not destroyed | 12.9 | 149 | 148 |
| Example 182 | (A1) | (A"1) | (B9) | (P165) | 416 | Not destroyed | 12.6 | 152 | 151 |
| Example 183 | (A1) | (A"1) | (B10) | (P166) | 421 | Not destroyed | 12.4 | 159 | 159 |
| Example 184 | (A1) | (A"1) | (B11) | (P167) | 412 | Not destroyed | 12.8 | 157 | 157 |
| Example 185 | (A1) | (A"1) | (B12) | (P168) | 422 | Not destroyed | 12.6 | 152 | 152 |
| Example 186 | (A1) | (A"1) | (B13) | (P169) | 403 | Not destroyed | 13.0 | 153 | 153 |
| Example 187 | (A1) | (A"1) | (B14) | (P170) | 414 | Not destroyed | 13.1 | 155 | 154 |
| Example 188 | (A1) | (A"1) | (B15) | (P171) | 409 | Not destroyed | 13.2 | 156 | 154 |
| Example 189 | (A1) | (A"1) | (B16) | (P172) | 414 | Not destroyed | 12.6 | 152 | 151 |
| Example 190 | (A1) | (A"1) | (B17) | (P173) | 412 | Not destroyed | 12.4 | 158 | 156 |

TABLE 15

| | Polymer for coating active material | Coated positive electrode active material | Viscous adhesive | Positive electrode for lithium-ion battery | Thickness of electrode active material layer (μm) | Stability in electrode solution | Internal resistance (Ω) | Initial discharge capacity (mAh/g) | Discharge capacity at the end of 20 cycles (mAh/g) |
|---|---|---|---|---|---|---|---|---|---|
| Example 191 | (A1) | (A"1) | (B1) | (P174) | 48 | Not destroyed | 13.1 | 163 | 163 |
| Example 192 | (A1) | (A"1) | (B1) | (P175) | 109 | Not destroyed | 12.9 | 159 | 159 |
| Example 193 | (A1) | (A"1) | (B1) | (P176) | 2042 | Not destroyed | 13.4 | 108 | 106 |

TABLE 16

| | Polymer for coating active material | Coated positive electrode active material | Viscous adhesive | Positive electrode for lithium-ion battery | Thickness of electrode active material layer (μm) | Stability in electrode solution | Internal resistance (Ω) | Initial discharge capacity (mAh/g) | Discharge capacity at the end of 20 cycles (mAh/g) |
|---|---|---|---|---|---|---|---|---|---|
| Comparative Example 19 | — | — | — | (CP13) | 402 | Destroyed in 2 mins | 12.7 | 21 | 9 |
| Comparative Example 20 | (A1) | (A"1) | — | (CP14) | 424 | Destroyed in 7 mins | 13.2 | 84 | 51 |
| Comparative Example 21 | — | — | (B18) | (CP15) | 415 | Destroyed in 5 mins | 12.8 | 90 | 41 |
| Comparative Example 22 | — | — | (B19) | (CP16) | 423 | Not destroyed | 18.1 | 159 | 82 |
| Comparative Example 23 | — | — | (B20) | (CP17) | 411 | Destroyed in 6 mins | 13.5 | 46 | 15 |
| Comparative Example 24 | — | — | (B21) | (CP18) | 406 | Destroyed in 8 mins | 13.6 | 80 | 35 |
| Comparative Example 25 | — | — | (B22) | (CP19) | 416 | Destroyed in 10 mins | 13.7 | 76 | 42 |
| Comparative Example 26 | — | — | (B23) | (CP20) | 410 | Destroyed in 10 hrs | 18.5 | 130 | 91 |

As indicated in the tables above, both the negative electrode and the positive electrode for a lithium-ion battery according to each example have excellent stability in the electrolyte solution and low internal resistance, with hardly any difference between the initial discharge capacity and the discharge capacity at the end of 20 cycles, i.e., these electrodes have excellent cycle characteristics.

In contrast, the electrodes for a lithium-ion battery in which the viscous adhesives were not used or the viscous adhesives of the comparative examples were used were easily destroyed in the electrolyte solution, or had high internal resistance, resulting in poor cycle characteristics.

INDUSTRIAL APPLICABILITY

The electrode for a lithium-ion battery of the present invention increases the energy density of a battery and achieves excellent cycle characteristics, owing to improved shape stability of the electrode. Thus, the lithium-ion battery containing the electrode for a lithium-ion battery of the present invention has a high capacity and excellent cycle characteristics, and is useful for a storage battery power source.

The invention claimed is:

1. A viscous adhesive for a lithium-ion electrode which allows active materials to adhere to each other in the lithium-ion electrode,
the viscous adhesive having a glass transition temperature of 60° C. or lower, a solubility parameter of 8 to 13 $(cal/cm^3)^{1/2}$, and a storage shear modulus of $2.0 \times 10^3$ to $5.0 \times 10^7$ Pa and a loss shear modulus of $2.0 \times 10^3$ to $5.0 \times 10^7$ Pa as measured in a frequency range of $10^{-1}$ to $10^1$ Hz at 20° C.,
wherein the viscous adhesive is an acrylic polymer essentially containing a constituent unit derived from a (meth)acrylic acid alkyl ester monomer, a proportion of the (meth)acrylic acid alkyl ester monomer in monomers constituting the viscous adhesive is 50 wt % or more based on a total monomer weight, the (meth) acrylic acid alkyl ester monomer contains 1,6-hexanediol di(meth)acrylate, and a proportion of a fluorine-containing monomer is less than 3 wt % based on the total monomer weight.

2. The viscous adhesive for the lithium-ion electrode according to claim 1,
wherein the viscous adhesive contains two or more (meth) acrylic acid alkyl ester monomers as constituent monomers, and a total content of the two or more (meth) acrylic acid alkyl ester monomers is 50 wt % or more based on the total monomer weight.

3. The viscous adhesive for s-the lithium-ion electrode according to claim 1,
wherein the viscous adhesive contains, as a constituent monomer, a monovinyl monomer copolymerizable with the (meth)acrylic acid alkyl ester monomer.

4. The viscous adhesive for the lithium-ion electrode according to claim 1,
wherein the viscous adhesive contains a (meth)acrylic acid monomer as a constituent monomer.

5. An electrode for a lithium-ion battery comprising:
an unbound product between the viscous adhesive according to claim 1 and a coated electrode active material including an electrode active material that occludes and releases lithium ions and a coating layer containing a coating resin on at least a portion of a surface of the electrode active material, with the proviso that starch, polyvinylidene fluoride, polyvinyl alcohol, carboxymethyl cellulose, polyvinylpyrrolidone, tetrafluoroethylene, styrene-butadiene rubber, polyethylene, polypropylene, and styrene-butadiene copolymer are each excluded from the electrode.

6. The electrode for the lithium-ion battery according to claim 5,
wherein a weight ratio of the coated electrode active material to the viscous adhesive (coated electrode active material/ viscous adhesive) is 90/10 to 99.99/0.01.

7. The electrode for the lithium-ion battery according to claim 5,
wherein an electrode active material layer constituting the electrode has a thickness of 150 μm or more.

8. A method of producing an electrode for a lithium-ion battery, comprising:
compressing a mixture of a coated electrode active material and a viscous adhesive for a lithium-ion electrode so as to form an electrode active material layer formed from an unbound product of the mixture containing the coated electrode active material and the viscous adhesive,
the coated electrode active material including an electrode active material that occludes and releases lithium ions and a coating layer containing a coating resin on at least a portion of a surface of the electrode active material,
the viscous adhesive for the lithium-ion electrode allowing active materials to adhere to each other in the lithium-ion electrode,
the viscous adhesive having a glass transition temperature of 60° C. or lower, a solubility parameter of 8 to 13 $(cal/cm^3)^{1/2}$, and a storage shear modulus of $2.0 \times 10^3$ to $5.0 \times 10^7$ Pa and a loss shear modulus of $2.0 \times 10^3$ to $5.0 \times 10^7$ Pa as measured in a frequency range of $10^{-1}$ to $10^1$ Hz at 20° C.,
wherein the viscous adhesive is an acrylic polymer essentially containing a constituent unit derived from a (meth)acrylic acid alkyl ester monomer, a proportion of the (meth)acrylic acid alkyl ester monomer in monomers constituting the viscous adhesive is 50 wt % or more based on a total monomer weight, the (meth) acrylic acid alkyl ester monomer contains 1,6-hexanediol di(meth)acrylate, and a proportion of a fluorine-containing monomer is less than 3 wt % based on the total monomer weight.

9. The method of producing the electrode for the lithium-ion battery according to claim 8,
wherein the viscous adhesive contains two or more (meth) acrylic acid alkyl ester monomers as constituent monomers, and a total content of the two or more (meth) acrylic acid alkyl ester monomers is 50 wt % or more based on the total monomer weight.

10. The method of producing the electrode for the lithium-ion battery according to claim 8,
wherein the viscous adhesive contains, as a constituent monomer, a monovinyl monomer copolymerizable with the (meth)acrylic acid alkyl ester monomer.

11. The method of producing the electrode for the lithium-ion battery according to claim 8,
wherein the viscous adhesive contains a (meth)acrylic acid monomer as a constituent monomer.

12. The method of producing the electrode for the lithium-ion battery according to claim 8,
wherein a weight ratio of the coated electrode active material to the viscous adhesive (coated electrode active material/viscous adhesive) in the mixture is 90/10 to 99.99/0.01.

13. The method of producing the electrode for a-the lithium-ion battery according to claim 8,
wherein the mixture is an electrolyte solution-containing mixture further containing an electrolyte solution, and the electrode active material layer is formed by compressing the electrolyte solution- containing mixture.

14. The method of producing the electrode for the lithium-ion battery according to claim 8,
wherein the electrode active material layer has a thickness of 150 μm or more.

15. The viscous adhesive for the lithium-ion electrode according to claim 1,
wherein the (meth)acrylic acid alkyl ester monomer contains n-butyl (meth)acrylate.

16. The method of producing the electrode for the lithium-ion battery according to claim 8,
wherein the (meth)acrylic acid alkyl ester monomer contains n-butyl (meth)acrylate.

* * * * *